(12) United States Patent
Akay et al.

(10) Patent No.: US 7,820,729 B2
(45) Date of Patent: Oct. 26, 2010

(54) PROCESS FOR PREPARING A FUNCTIONALISED POLYHIPE POLYMER

(75) Inventors: Galip Akay, Newcastle Upon Tyne (GB); Zainura Zainon Noor, Newcastle Upon Tyne (GB); Omer Faruk Calkan, Newcastle Upon Tyne (GB); Teresa Manguangua Ndlovu, Newcastle Upon Tyne (GB); David Robert Burke, Newcastle Upone Tyne (GB)

(73) Assignee: University of Newcastle Upon Tyne, c/o School of Chemical Engineering and Advanced Materials (GB)

( * ) Notice: Subject to any disclaimer, the term of this patent is extended or adjusted under 35 U.S.C. 154(b) by 1231 days.

(21) Appl. No.: 11/403,996

(22) Filed: Apr. 13, 2006

(65) Prior Publication Data

US 2008/0281003 A1    Nov. 13, 2008

(51) Int. Cl.
*C08F 2/00* (2006.01)
*C08F 2/24* (2006.01)
*C08F 2/22* (2006.01)
*C08F 2/46* (2006.01)

(52) U.S. Cl. .................. 521/50.5; 521/64; 521/134; 521/135; 521/140; 521/143; 521/146; 521/149; 521/150; 521/915; 522/1; 522/84; 522/85; 522/86

(58) Field of Classification Search ............... 521/50.5, 521/64, 134, 135, 140, 143, 146, 149, 150, 521/915; 522/1, 84, 85, 86
See application file for complete search history.

(56) References Cited

U.S. PATENT DOCUMENTS

| 4,522,953 | A | * | 6/1985  | Barby et al.      | 521/64  |
| 4,606,958 | A | * | 8/1986  | Haq et al.        | 428/68  |
| 4,611,014 | A | * | 9/1986  | Jomes et al.      | 521/146 |
| 4,612,334 | A | * | 9/1986  | Jones et al.      | 521/146 |
| 4,775,655 | A | * | 10/1988 | Edwards et al.    | 502/416 |
| 4,788,225 | A | * | 11/1988 | Edwards et al.    | 521/147 |
| 4,839,395 | A | * | 6/1989  | Masamizu et al.   | 521/56  |
| 5,147,345 | A | * | 9/1992  | Young et al.      | 604/378 |
| 5,149,720 | A | * | 9/1992  | DesMarais et al.  | 521/63  |
| 5,198,472 | A | * | 3/1993  | DesMarais et al.  | 521/63  |
| 5,200,433 | A | * | 4/1993  | Beshouri          | 521/64  |
| 5,763,499 | A | * | 6/1998  | DesMarais         | 521/64  |
| 5,795,921 | A | * | 8/1998  | Dyer et al.       | 521/146 |

FOREIGN PATENT DOCUMENTS

| EP | 0060138 B1 | * | 9/1982 |
| WO | WO 0034454 A2 | * | 6/2000 |
| WO | WO 2004005355 A1 | * | 1/2004 |

* cited by examiner

*Primary Examiner*—Sanza L McClendon
(74) *Attorney, Agent, or Firm*—Harness, Dickey & Pierce, P.L.C.

(57) ABSTRACT

A process for preparing functionalised microporous polymers (which are also known as micro-cellular polymers or polyHIPE polymers (PHPs)) using intensified internal heating (for example by microwave irradiation).

38 Claims, 21 Drawing Sheets

GA2S-2

GA3S -2 (THD-1)

GA4S-2 (THC-2)

GA45-4 (THC-2)

GA2S (MWD-7)

GA2S (MWD-7)

Figure 1:
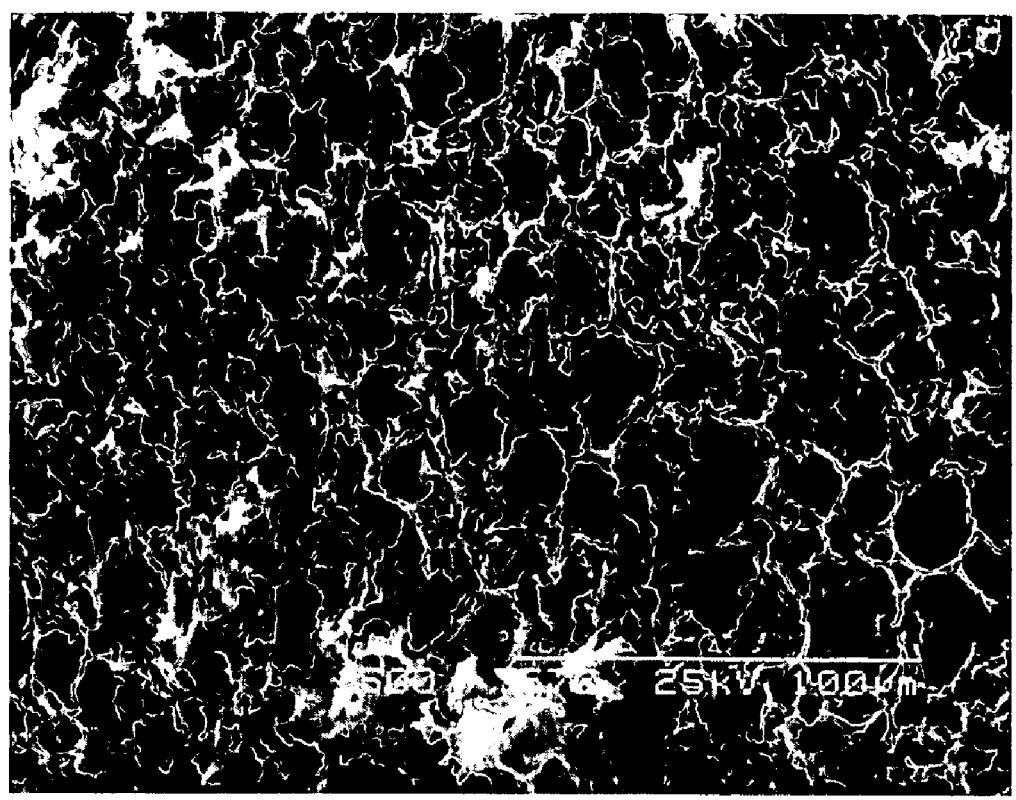

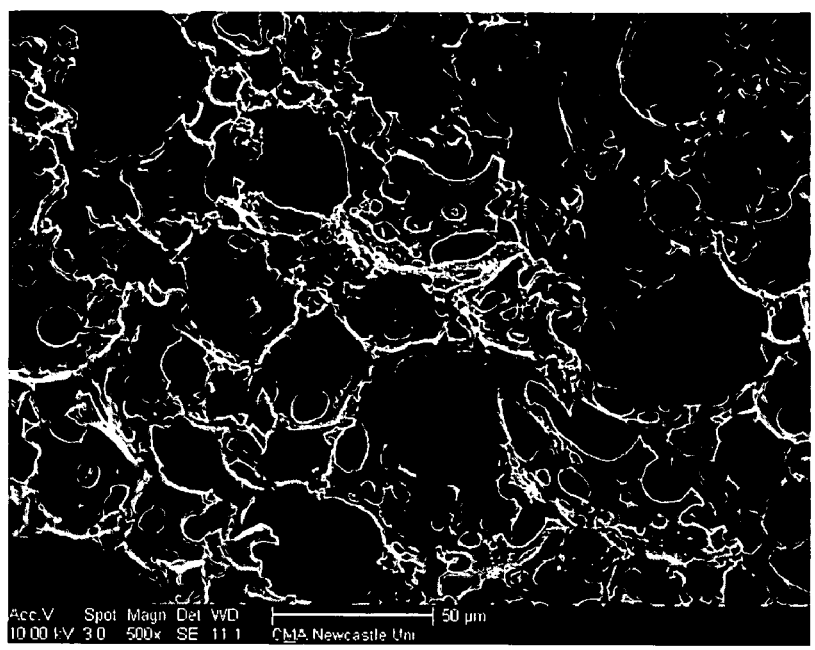
(MWC-C2)  Fig. 6A
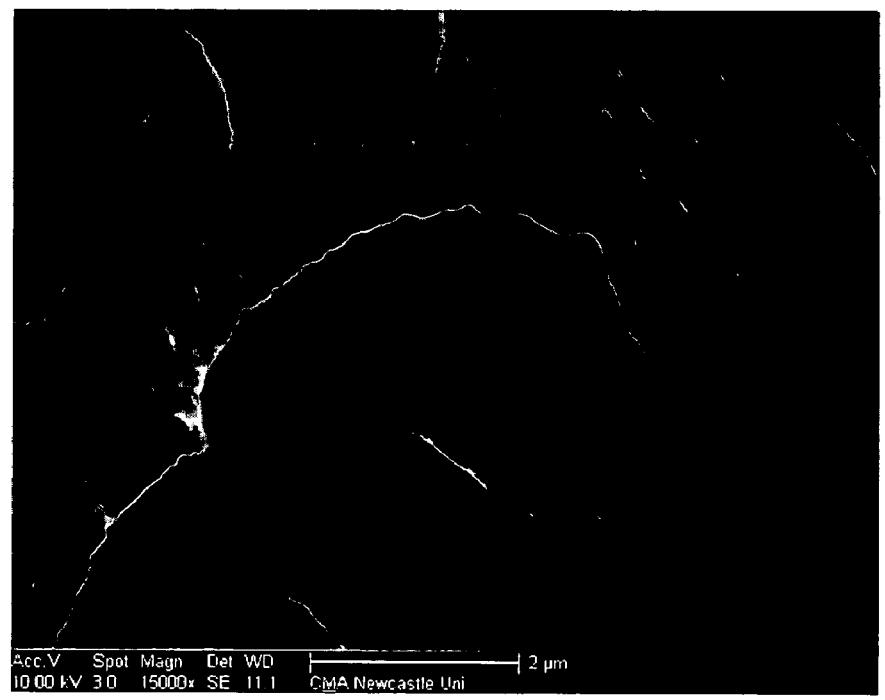
(MWC-C5)  Fig. 6B

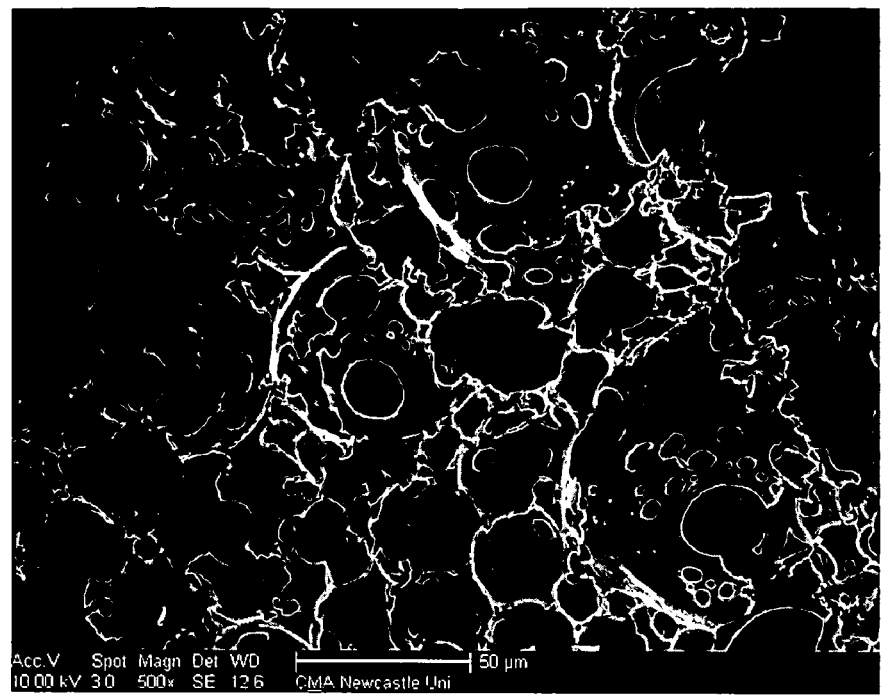
(MWC-D2)          Fig. 7A
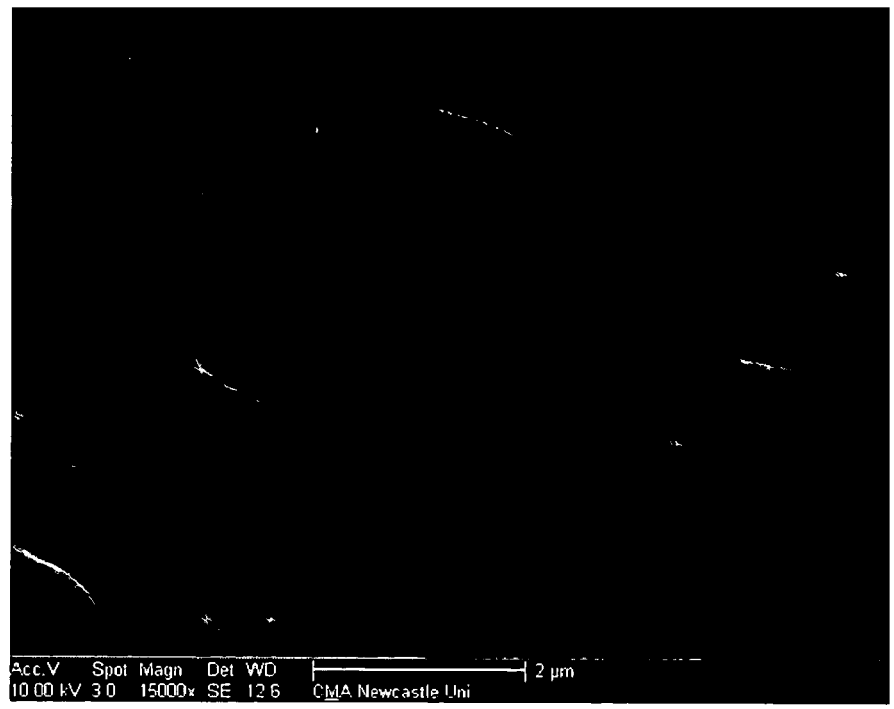
(MWC –D5)          Fig. 7B

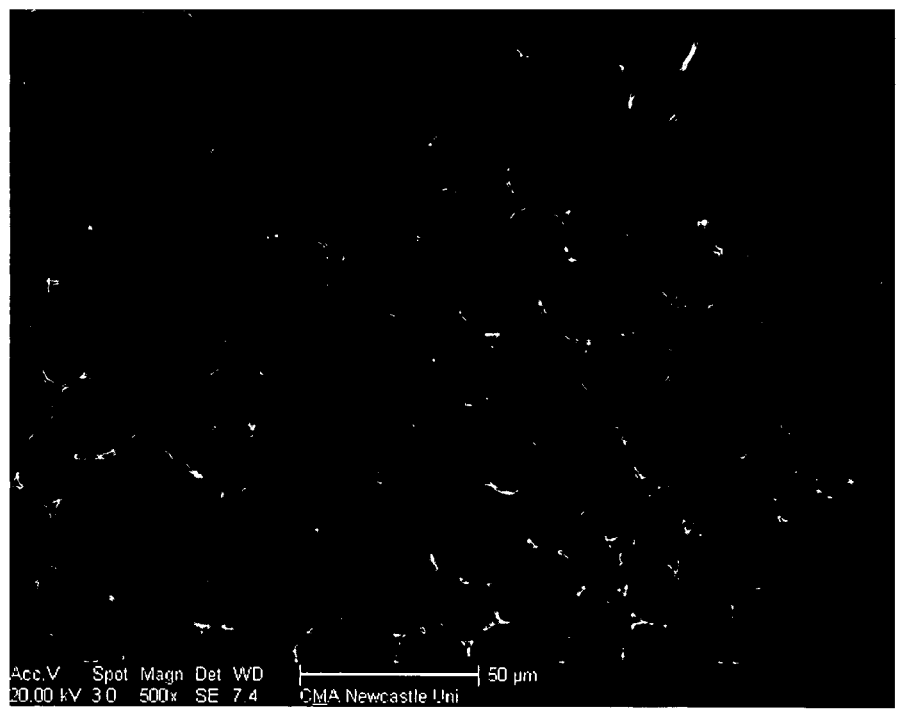
(GA2N-5)            Fig. 8A
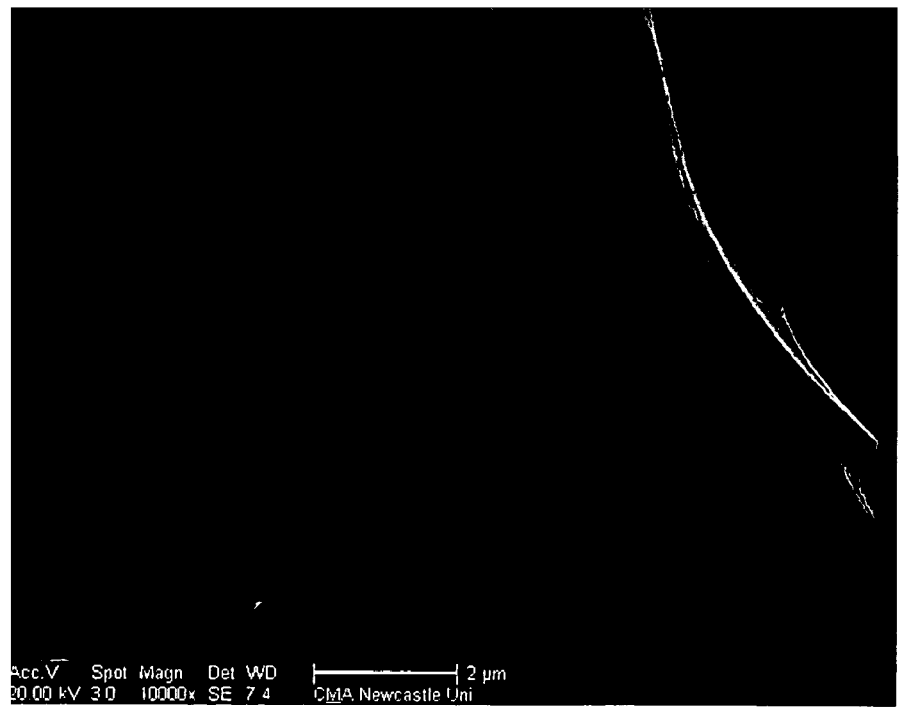
Fig. 8B

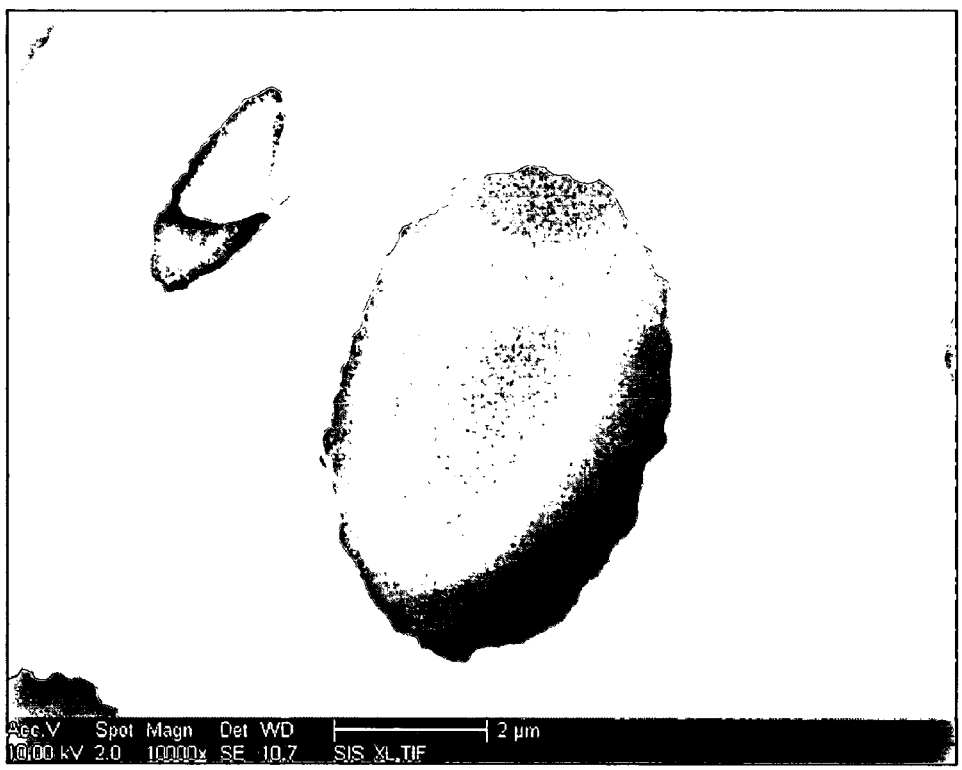
Fig. 9A: (GA3-11)
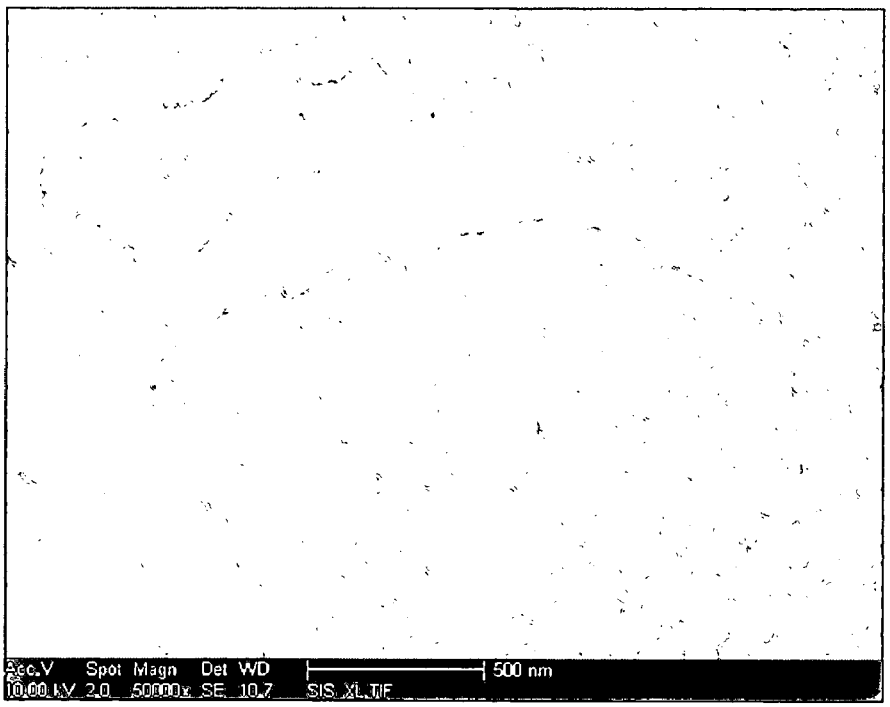
Fig. 9B (GA3-14)

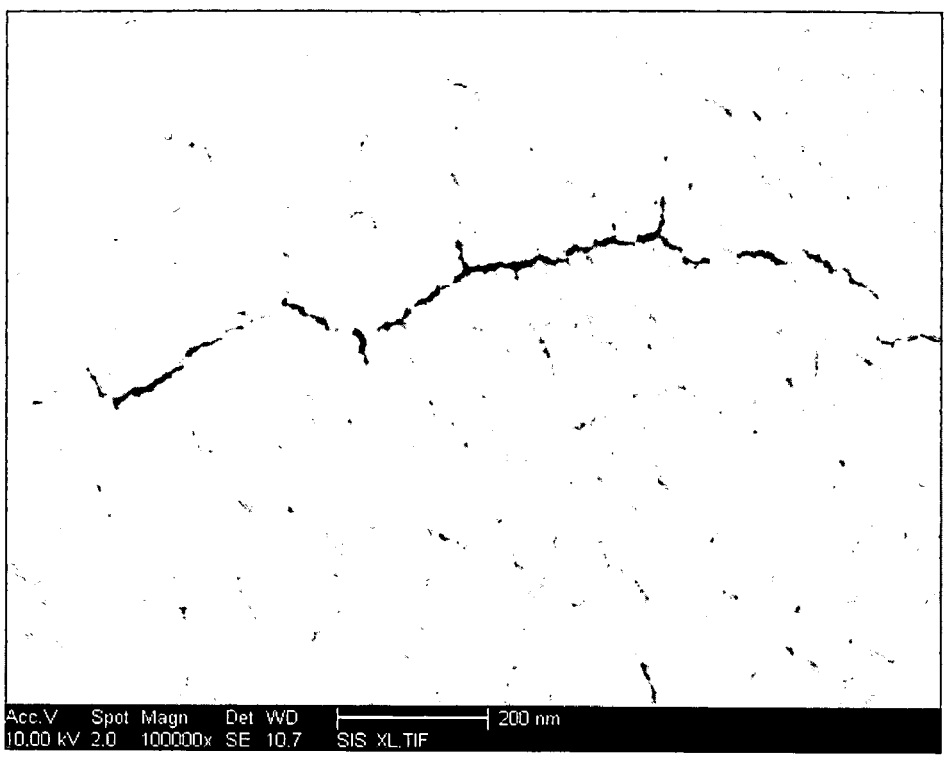
Fig. 9C
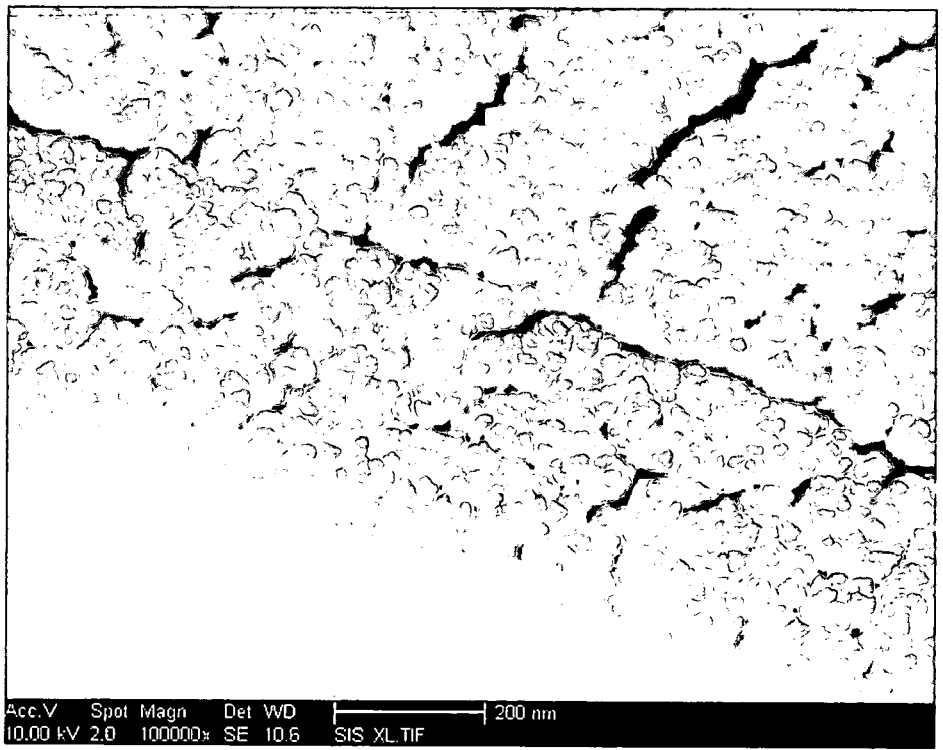
Fig. 9D (GA-3-9)

| Sample X-1: Before sulphonation Surface area = 128. 6 m$^2$g$^{-1}$ | Sample X-2: After sulphonation of sample X-1 with microwave for 8 minutes Surface area = 242. 7 m$^2$g$^{-1}$ |
|---|---|
| 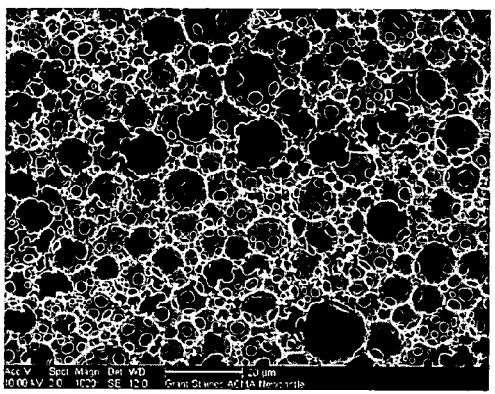 Fig. 11A: Magnification : 1000x (X1-4) | 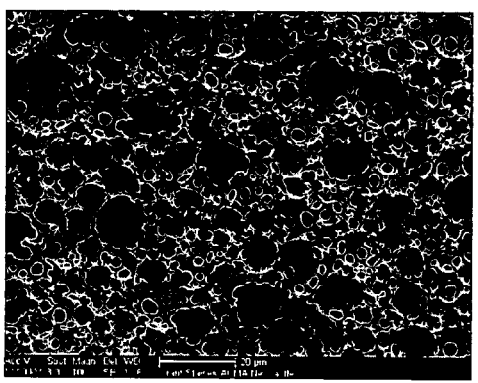 Fig. 11D: Magnification : 1000x (X2-5) |
|  Fig. 11B: Magnification : 10000x (X1-7) | 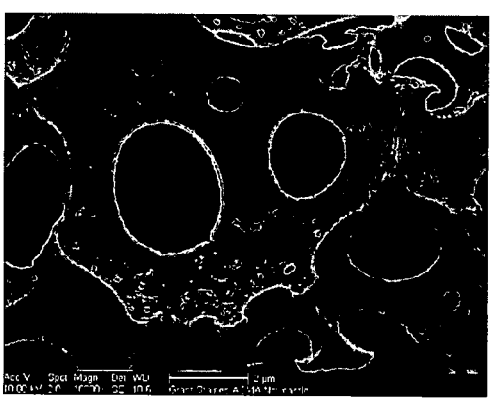 Fig. 11E: Magnification : 10000x (X2-3) |
| 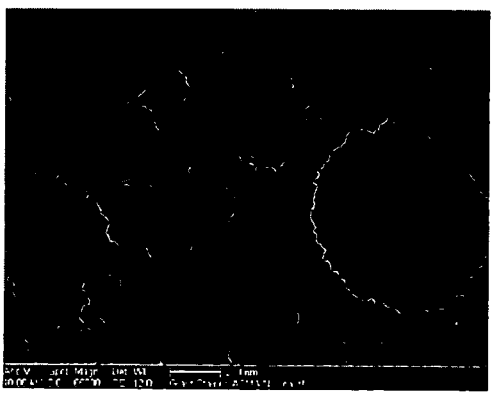 Fig. 11C: Magnification : 65000x (X1-6) | 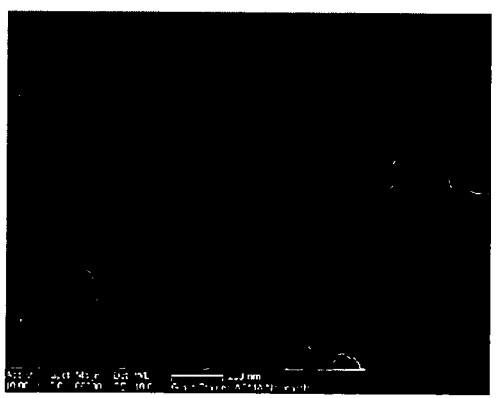 Fig. 11F: Magnification: 65000x(X2-2) |

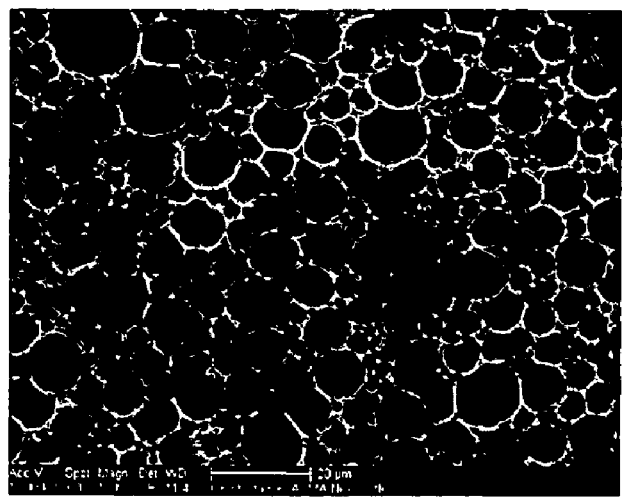
Fig. 11G: Sample X3 :Magnification : 1000x (X3-2)
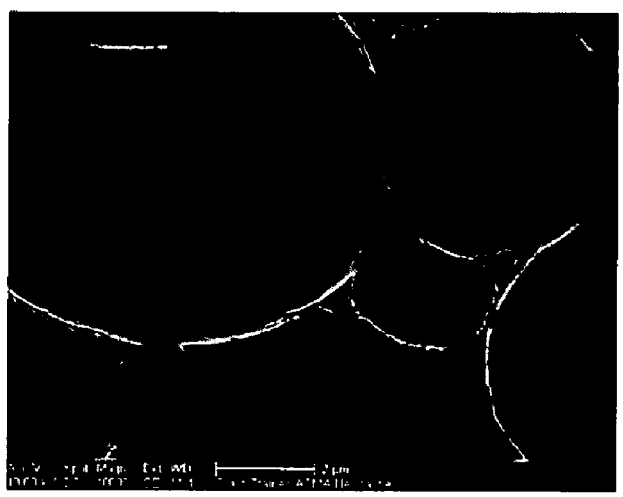
Fig. 11H: Sample X3: Magnification : 10000x (X3-3)
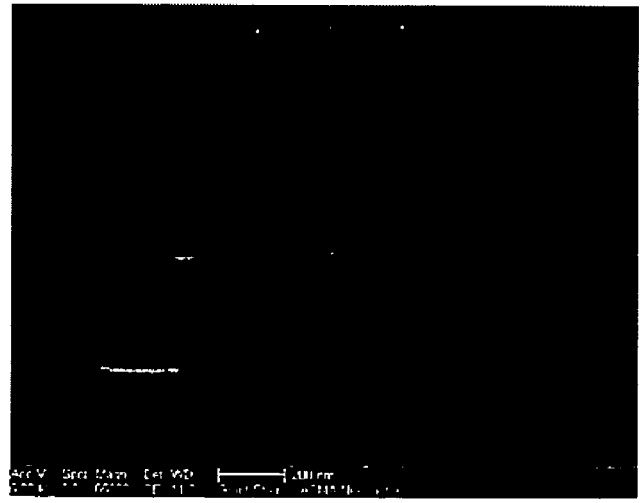
Fig. 11I: Sample X3: Magnification :65000x (X3-5)

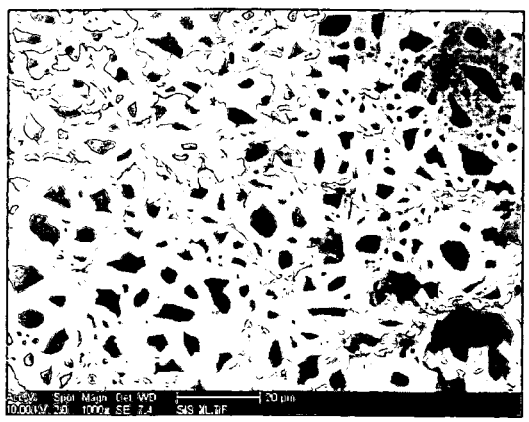
Fig. 12A: (X 1000)
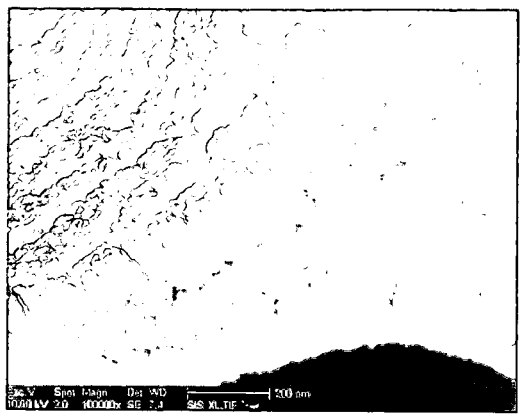
Fig. 12B: (X100,000)
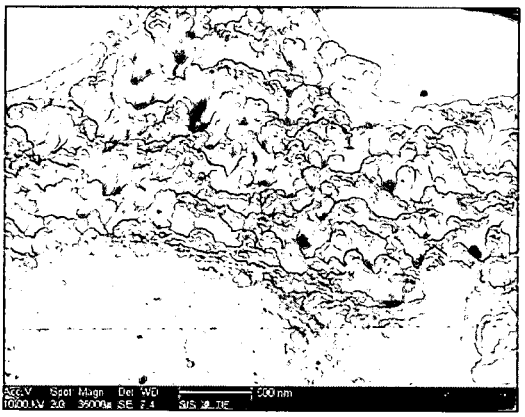
Fig. 12C: (X35,000)
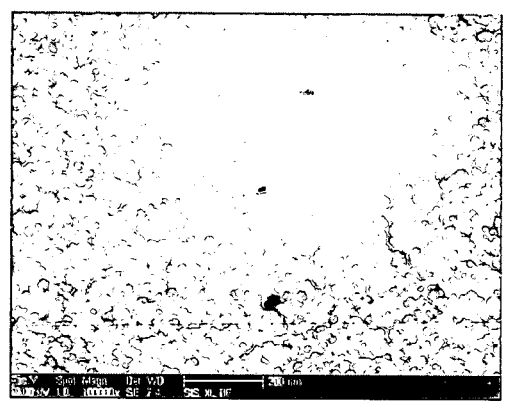
Fig. 12D: (X100,000)

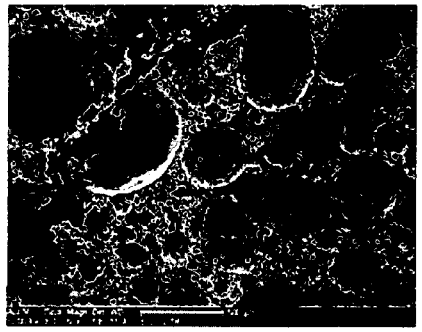
Fig. 13A: Sample: A9A-5:
Coalescence Pores dispersed into primary pores
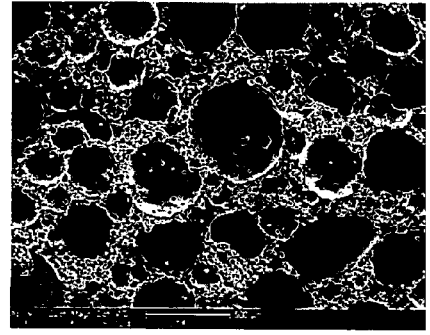
Fig. 14A: Sample A9A-1:
Coalescence Pores dispersed into primary pores
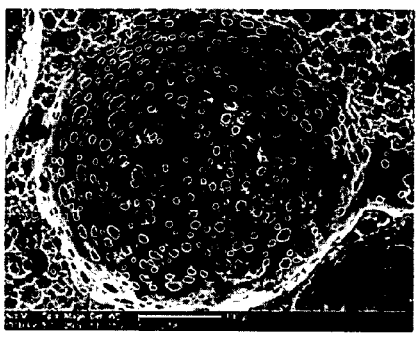
Fig. 13B: Sample A9A-6:
Coalescence pore
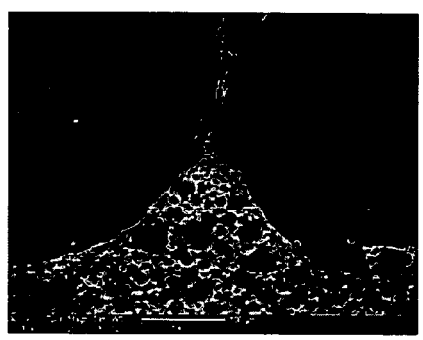
Fig. 14B: Sample A9B-7: Two coalescence pores
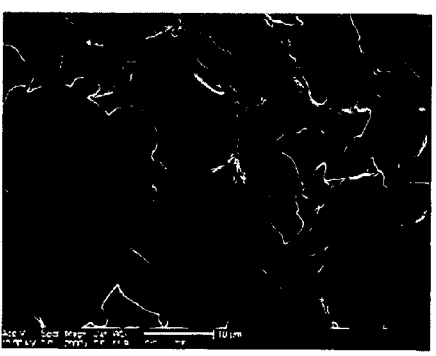
Fig. 13C: Sample: A9A-8: Primary pores
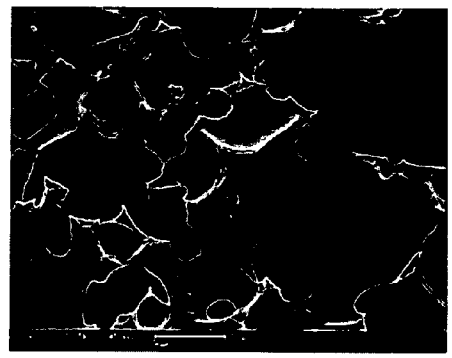
Fig. 14C: Sample: A9B-4: Primary pores

Fig. 13D: Sample: A9A-2: Fracture surface of pore wall
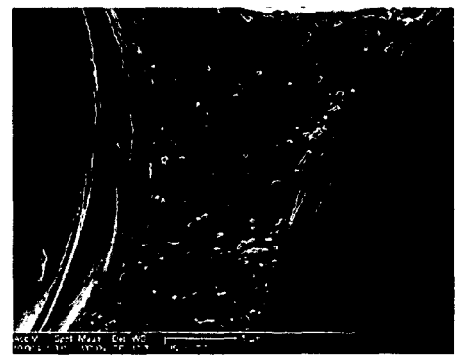
Fig. 14D: Sample: A9B-4 Fracture surface of pore wall
Fig. 13E: Sample A9A-1: Detail of the fracture surface in A9A-2
Fig. 14E: Sample A9B-2: Fracture surface detail
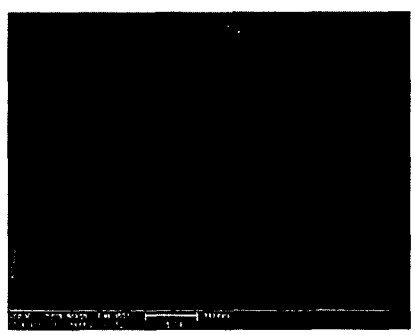
Fig. 13F: Sample A9A-7: Surface appearance of coalescence pore in A9A-6
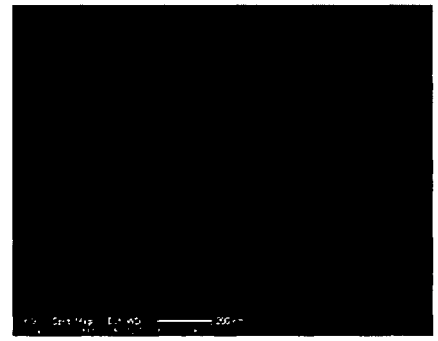
Fig. 14F: Sample: A9B-9: Surface of coalesce pore showing fine cracks which are absent before irradiation.

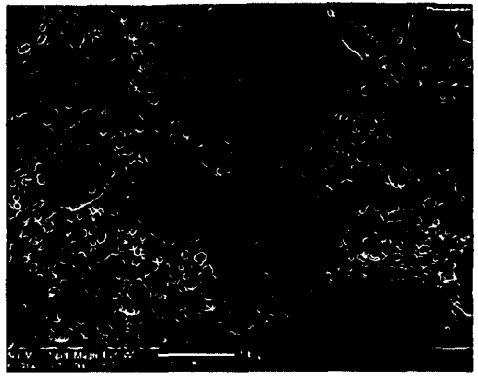
Fig. 15A: A74A-7:
Coalescence pores
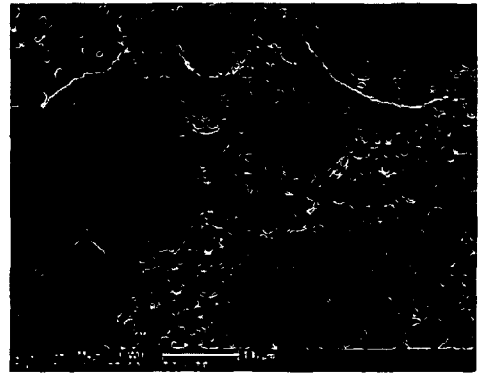
Fig. 16A: A74B-5:
Coalesce pores
Fig. 15B: A74A-6:
Wall structure
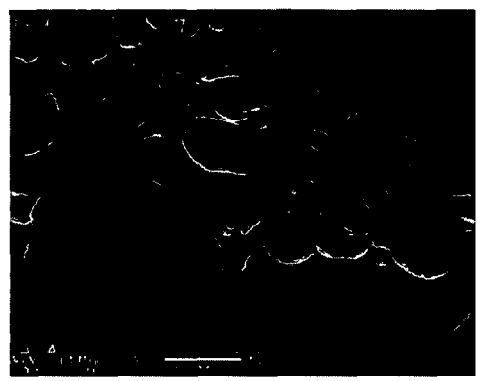
Fig. 16B: A74B:
Wall structure
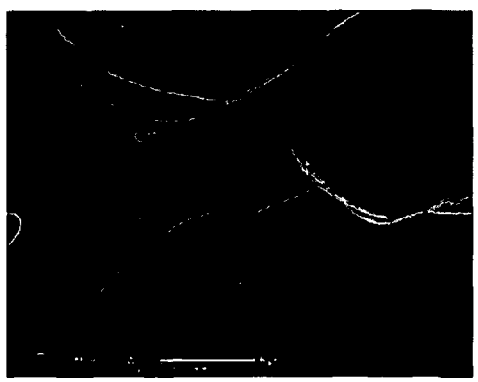
Fig. 15C: Sample A74A-5: fracture
surface of wall
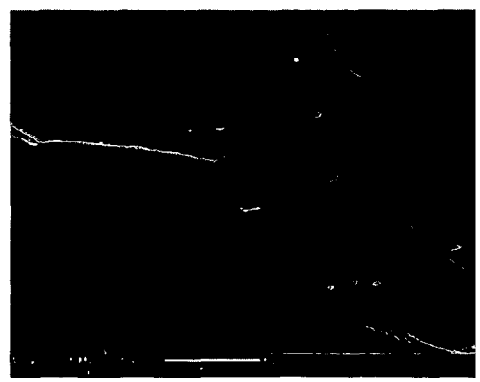
Fig. 16C: Sample A74B-3: Fracture
surface of wall

Fig. 15D: Sample: A74A-2: Fracture surface of wall (Magnification: X 100,000)
Fig. 16D: Sample: A74B-1 Fracture surface of wall (Magnification: X50,000)

Fig. 15E: Sample A74A-8: Surface of a coalescence pore at magnification X 100,000. No sign of surface cracks.
Fig. 16E: Sample A74A-8: Surface of a coalescence pore at magnification X 20,000.
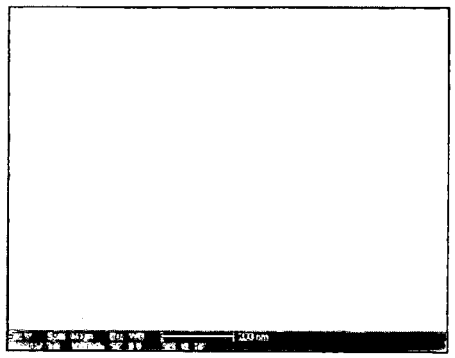
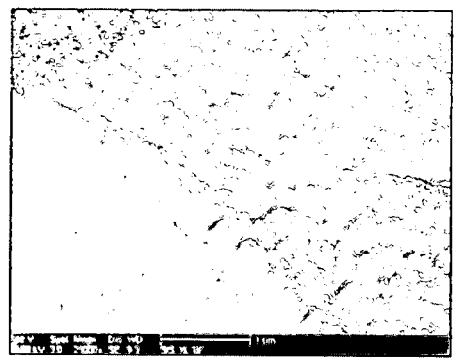

PROCESS FOR PREPARING A FUNCTIONALISED POLYHIPE POLYMER

FIELD

The present invention relates to a process for preparing functionalised nano-structured nano-microporous polymers (which are also known as micro-cellular polymers or polyHIPE polymers (PHPs)) by subjecting a functionalisable polyHIPE polymer to intensified internal heating.

BACKGROUND

The statements in this section merely provide background information related to the present disclosure and may not constitute prior art.

EP0060138, WO-A-00/34454 and WO-A-02/10070 describe the preparation of sulphonated polyHIPE polymers by soaking small pieces of material in concentrated sulphuric acid and raising the temperature to 60° C. over various time spans to achieve a desired degree of sulphonation. Sulphonation starts from the exterior causing the large particles to swell and making interconnecting holes smaller thereby reducing the penetration of the acid into the interior. This causes the formation of a hydrophilic skin with a hydrophobic core. Whilst it may be possible to obtain a fairly uniformly sulphonated polymer as a powder in which the diameter of the sulphonated particles is 1 cm or less, it is not possible to obtain uniformly sulphonated polymer in bulk. As the size of the pores is decreased, sulphonation becomes more difficult. This technique can not be used for large size monolithic polymers since the penetration of the acid into the polymer is restricted. After sulphonation, excess acid is washed away or neutralized and the polymer is dried. This process is less than straightforward and several washing cycles are typically required which generates excessive amounts of waste.

These drawbacks have been addressed in WO2004/005355 and WO 2004/004880 which describe the preparation of sulphonated polyHIPE polymers by incorporating dilute sulphuric acid as the dispersed (aqueous) phase during emulsification so that the acid is uniformly distributed within the pores when the emulsion is polymerized. After polymerization, the temperature is increased above 100° C. which results in sulphonation of the residual surfactants and a further rise in temperature above 140° C. results in sulphonation of the polymer. However, the sulphonation time is still long and the resulting polymers (although hydrophilic) are slow to take up water. Although the sulphonation time could be reduced (typically to 45 minutes) by increasing the temperature to 200° C., high temperatures are not desirable since the degree of sulphonation may be reduced.

The technique disclosed in EP0060138 uses highly concentrated sulphuric acid and is only suitable for small pieces of PHP. After sulphonation, excess acid has to be removed and PHP is washed with water and subsequently neutralized if desired.

Conventional nitration of PHP is time consuming and environmentally unfriendly due to the production of large amounts of dilute acid. Production of large monolithic structures is difficult due to poor penetration of acid into the polymer.

SUMMARY

The present invention is based on the recognition that when a polyHIPE polymer containing a functional material (eg in the dispersed phase) is subjected to intensified internal heating (eg by microwave irradiation), a chemical reaction on the walls of the micro-porous polymer or within the pores is started and rapidly propagated.

Viewed from a first aspect the present invention provides a process for preparing a functionalised polyHIPE polymer comprising:

(a) obtaining in a first phase a polymerisable component, said polymerisable component comprising a functionalisable moiety;

(b) obtaining a second phase;

(c) forming a high internal phase emulsion of the first phase and the second phase, wherein the first phase and the second phase are at least partially immiscible;

(d) causing polymerisation of the polymerisable component into a polyHIPE polymer, wherein a functionalising agent is present in the first phase or second phase or the first phase and the second phase or is added to the polyHIPE polymer; and (e) subjecting the polyHIPE polymer to intensified internal heating to cause functionalisation of at least a proportion of the functionalisable moieties.

Intensified internal heating of polyHIPE polymers containing a small amount of functionalising agent results in intensified functionalisation. This advantageously allows large scale and high rate functionalisation without the need for excessive washing or separation of residues thereby making the process economically viable.

The process of the invention may advantageously lead to functionalised polyHIPE polymer in bulk with substantially uniform functionalisation. For example, relatively large blocks of substantially uniformly functionalised polyHIPE polymer (eg >1 cm diameter) may be obtained.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2A:
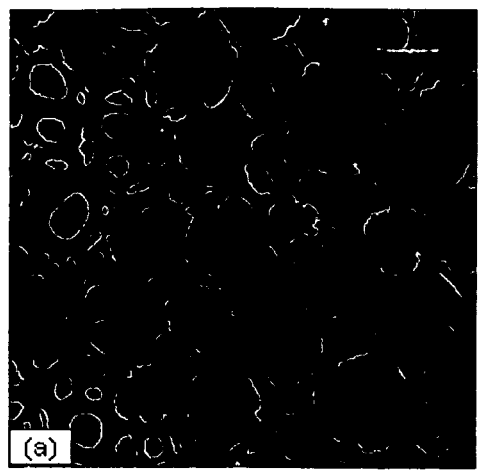
Figure 2B:
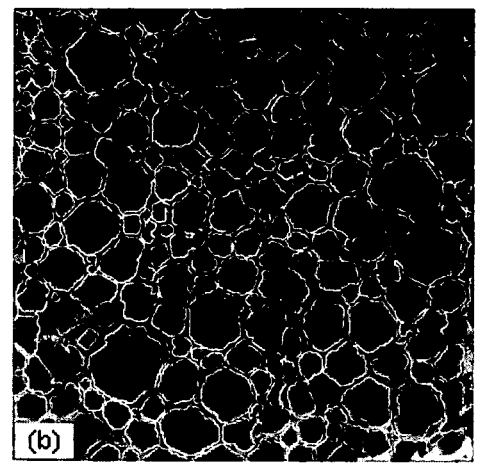
Figure 2C:
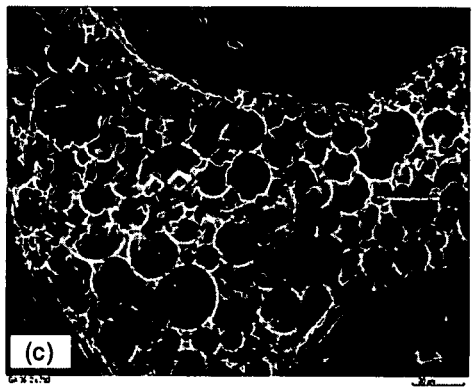
Figure 2D:
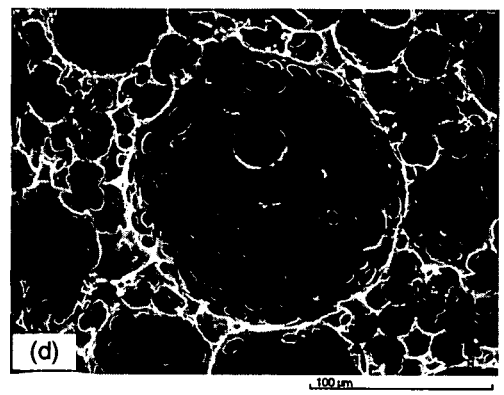

FIG. 1 illustrates the micro-structure of sulphonated PHP according to WO-A-00/34454 or WO-A-2004/005355;

FIGS. 2A-2D illustrate typical primary and coalescence pore structures of polyHiPE polymers before functionalisation: FIG. 2A—primary pores with large interconnecting holes, FIG. 2B—primary pores with nano-sized interconnecting holes, FIG. 2C—large coalescence pores (3 such pores are partially shown) dispersed into the primary pores in the process of coalescence, FIG. 2D—detail of the coalescence pores. These pore structures can be prepared over a wide size range.

Figure 3A:
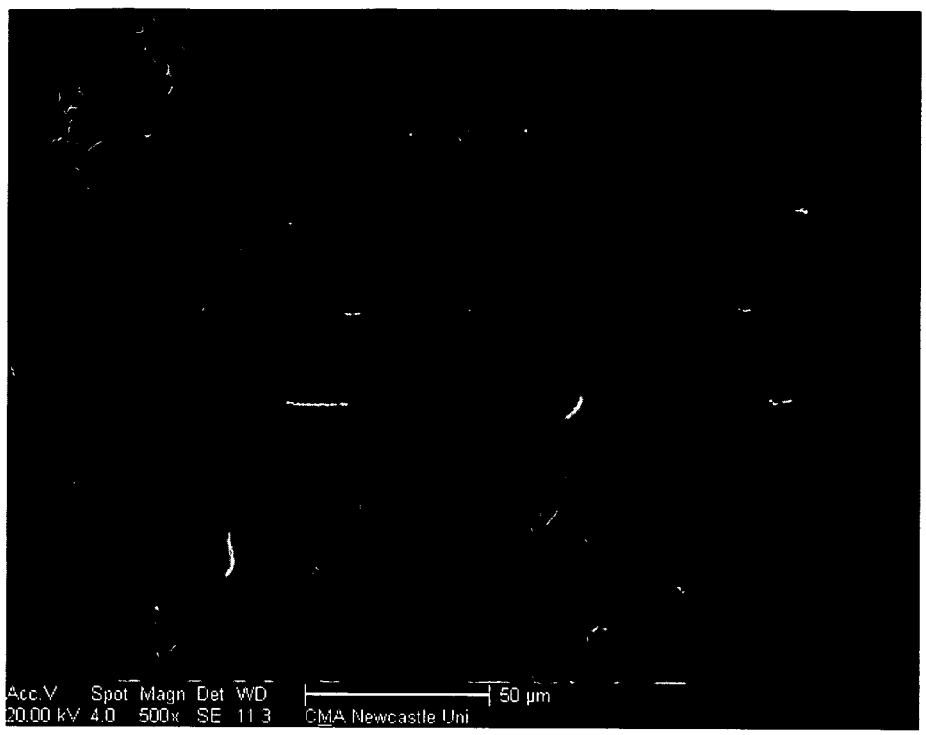
Figure 3B:
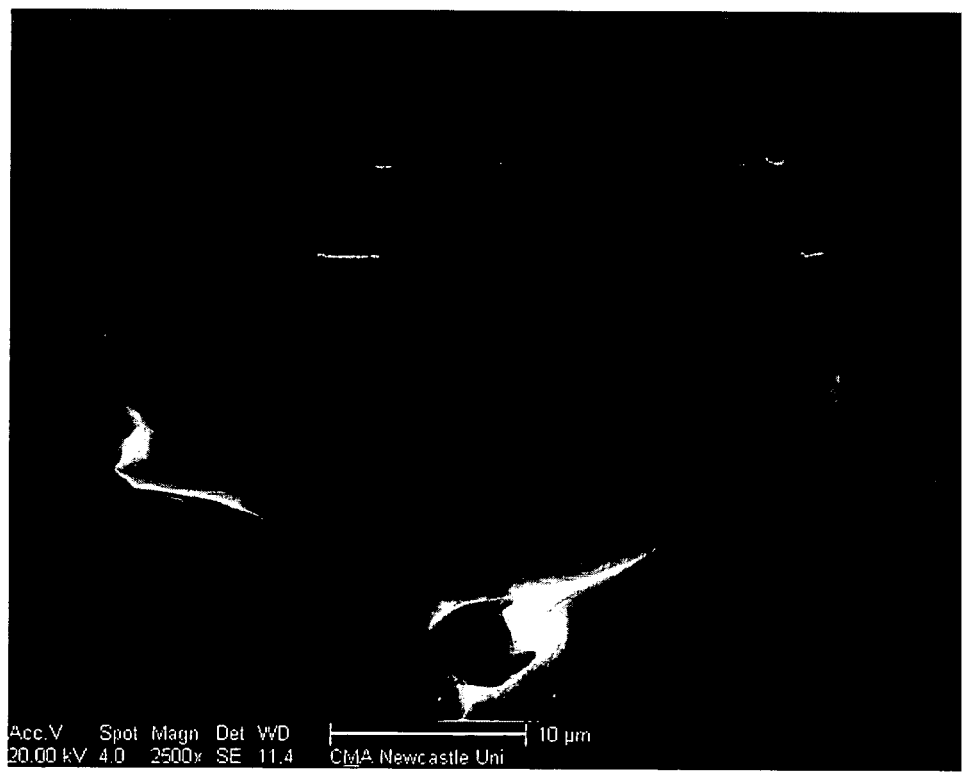
Figure 4A:
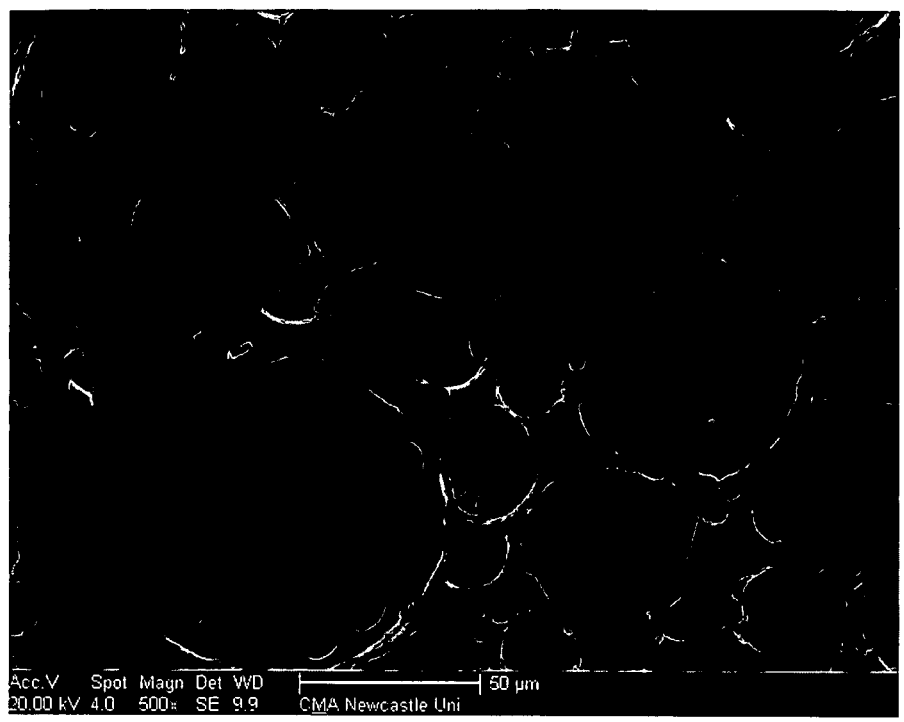
Figure 4B:
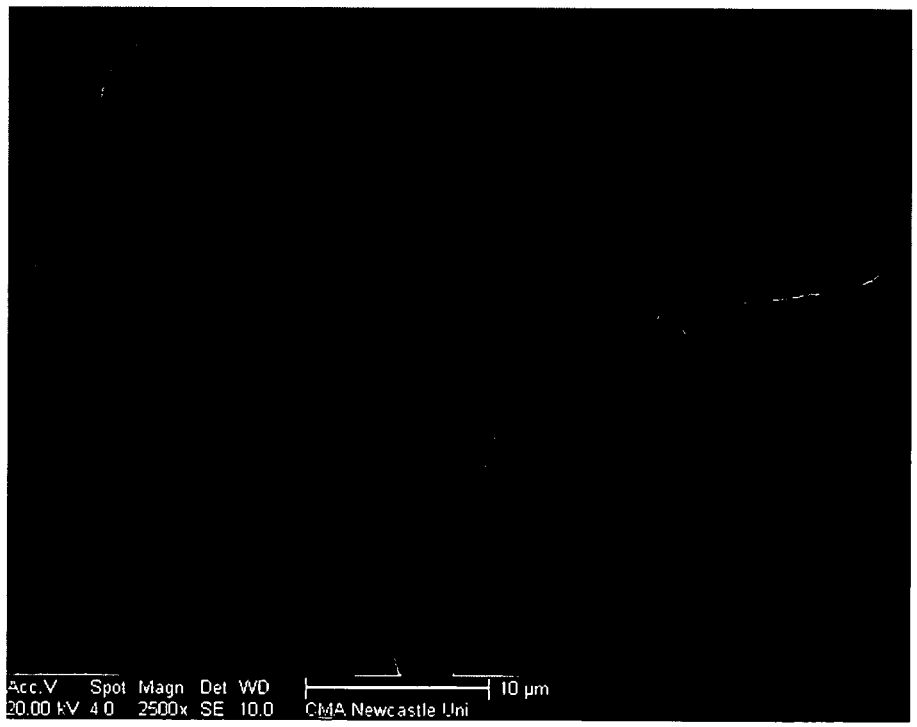
Figure 5A:
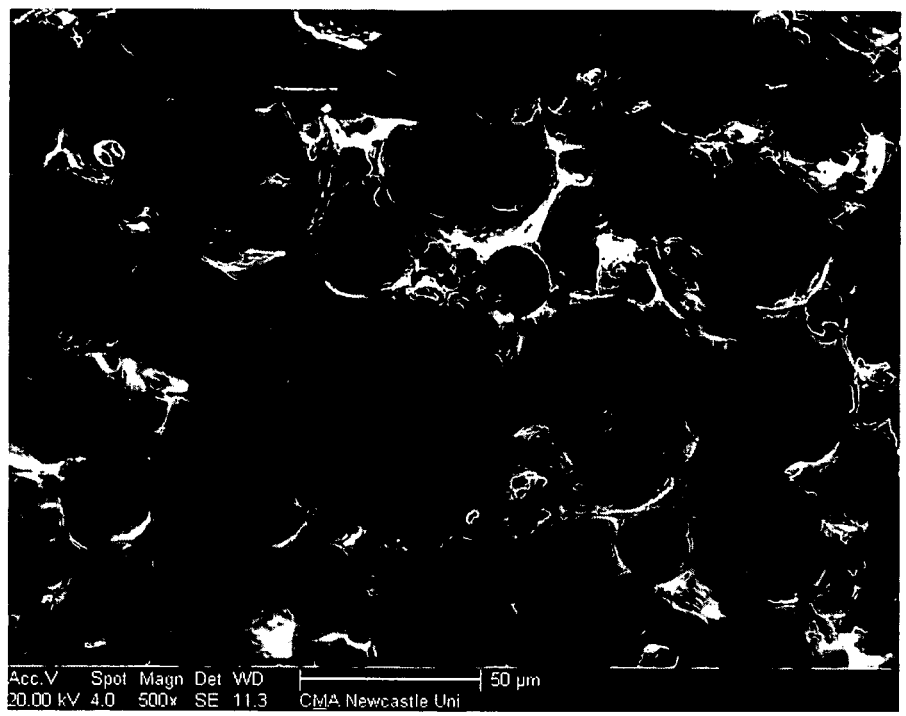
Figure 5B:
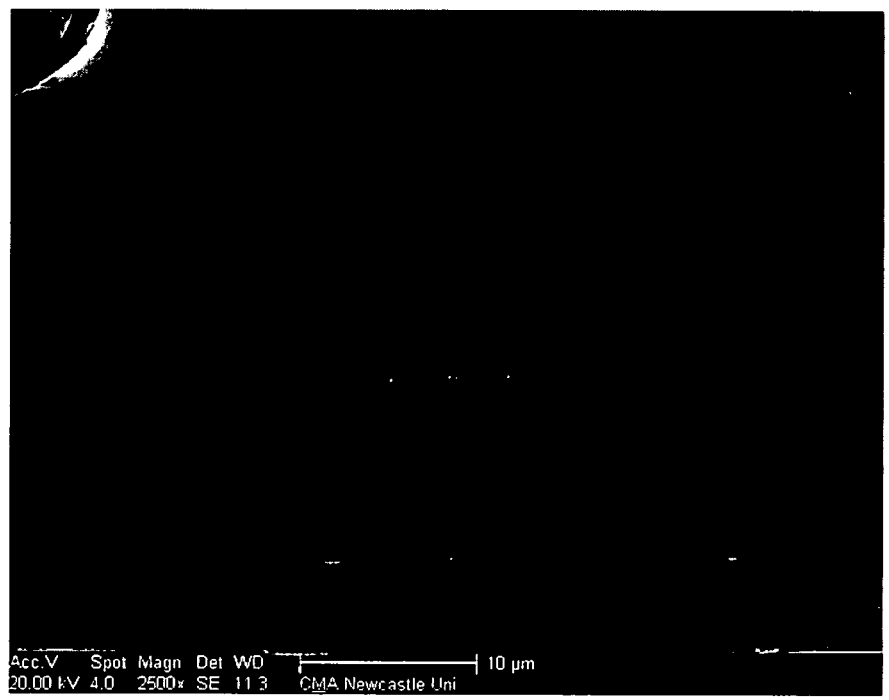
Figure 10A:
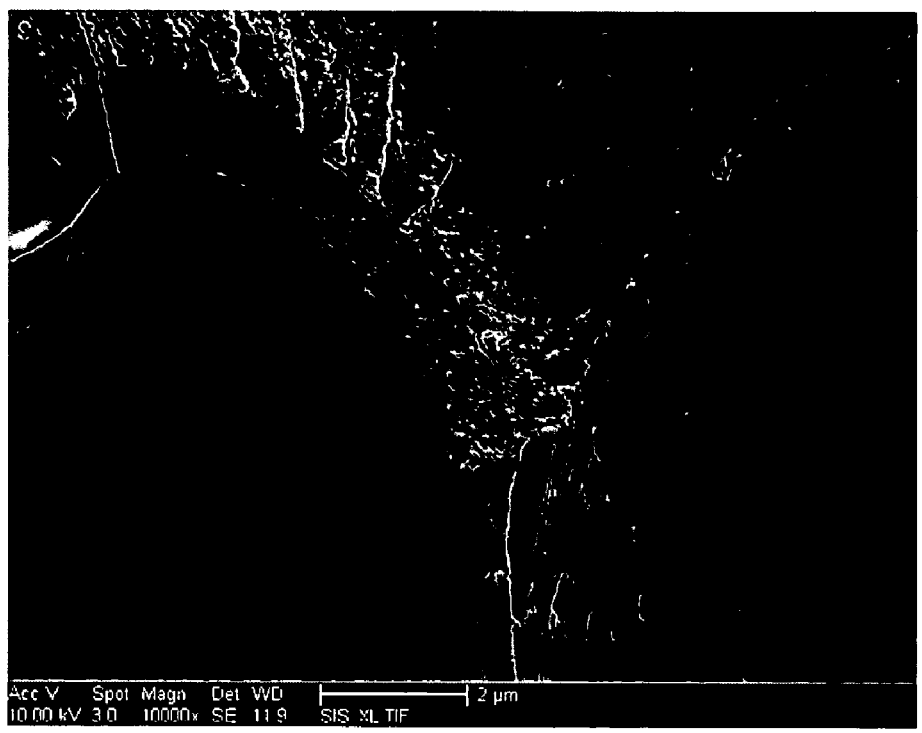
Figure 10B:
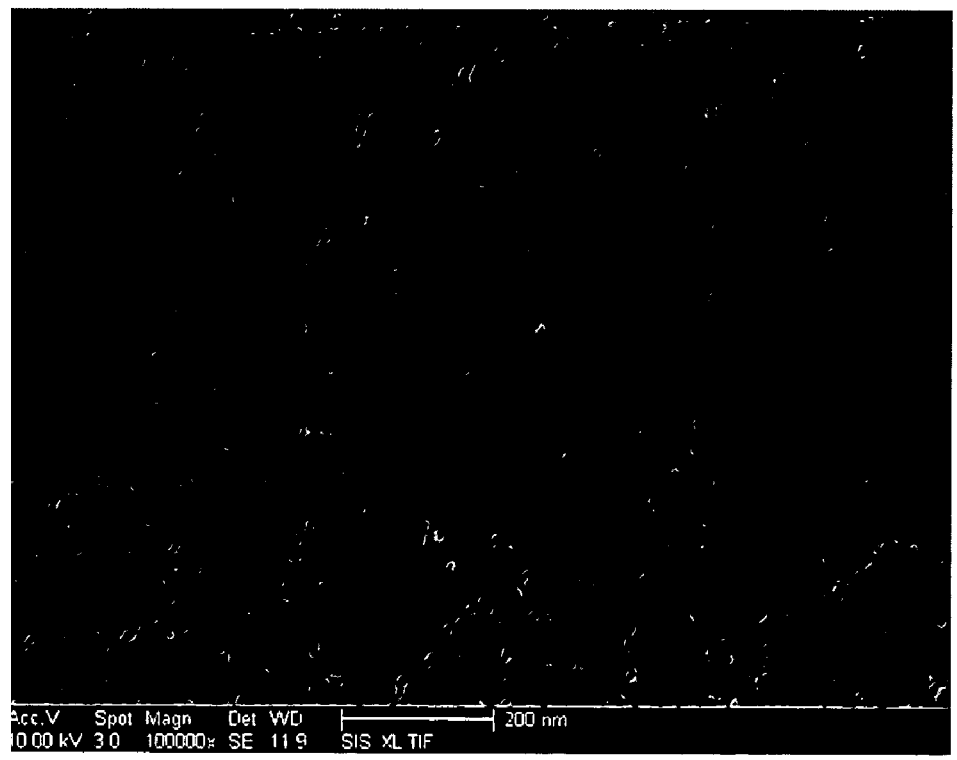
Figure 17:
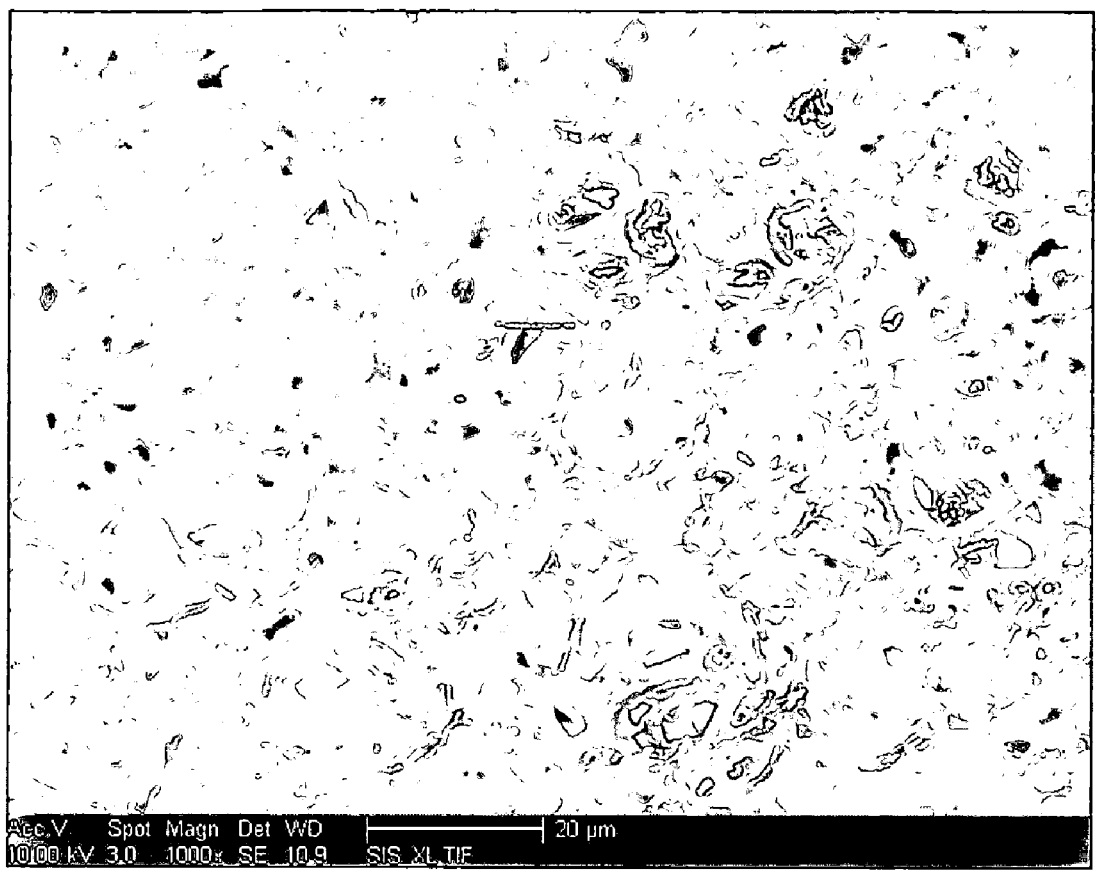

FIG. 3A is a SEM micrograph of sulphonated PHP at low magnification prepared according to method 1 of the invention;

FIG. 3B is a SEM micrograph at high magnification of sulphonated PHP prepared according to method 1 of the invention (T=180° C., t=180 min. No Initial drying. Smooth surface is present);

FIG. 4A is a SEM micrograph at low magnification of PHP prepared according to method 2 of the invention (T=180° C., t=180 min. Initial drying. Smooth surface is present. Note the formation of coalescence pores from the primary pores);

FIG. 4B is a SEM micrograph at high magnification of sulphonated PHP prepared according to method 2 of the invention (T=180° C., t=180 min. Initial drying. Smooth surface is present);

FIG. 5A is a SEM micrograph at low magnification of sulphonated PHP prepared according to method 4 of the invention (MW irradiation time t=4 min. Sample not dried initially. Surface contains blisters (see FIG. 6B);

FIG. 5B is a SEM micrograph at high magnification of sulphonated PHP prepared according to method 3 of the invention (MW irradiation time t=4 min. Sample not dried initially. Surface contains blisters. Washed);

FIG. 6A is a SEM micrograph at low magnification of sulphonated PHP prepared according to method 4 of the invention (MW irradiation time t=4 min. Sample dried initially. Surface contains blisters. Washed);

FIG. 6B is a SEM micrograph at high magnification of sulphonated PHP prepared according to method 4 of the invention (MW irradiation time t=4 min. Sample dried initially. Surface contains blisters);

FIG. 7A is a SEM micrograph at low magnification of sulphonated PHP prepared according to method 4 of the invention followed by reaction with sodium hypochlorite solution (13% active chlorine) and then by washing and drying (MW irradiation time t=4 min. Sample dried initially. Surface contains flattened blisters as shown in FIG. 7B);

FIG. 7B is a SEM micrograph at high magnification of sulphonated PHP prepared according to method 4 of the invention followed by reaction with sodium hypochlorite solution (13% active chlorine) and then by washing and drying (MW irradiation time t=4 min. Sample dried initially. Surface contains flattened blisters);

FIG. 8A is a SEM micrograph at low magnification of nitrated polyHIPE polymer (MW time=10 min. Washed and dried sample);

FIG. 8B is a SEM micrograph at high magnification of nitrated polyHIPE polymer (MW time=10 min. Washed and dried sample. No blisters and very smooth surface);

FIGS. 19A-9D illustrate the effect of microwave sulphonation on the fine structure of polyHIPE polymer, FIG. 9A (GA3-11)—Blisters appear to form interconnects, FIG. 9B (GA3-14)—Blisters before the formation of interconnects. Nanocracks appear to coalesce in a circle to form the blisters. FIG. 9C (GA3-13)—Fine detail of the blisters and the thicker wall region, FIG. 9D (GA3-9)—Fracture surface of the wall showing connectivity with the surface;

FIGS. 10A-10B illustrate the effect of thermal sulphonation on the fine structure of polyHIPE polymer: FIG. 10A (GA-6-3)—Fracture surface of the wall with two coalesce pores. No blisters apparent. FIG. 10B (GA6-7)—Fine structure of surface with micro-cracks;

FIGS. 11A-11I illustrate the effect of sulphonation on polyHIPE polymer surface area, nano-structure and connectivity, FIGS. 11A-11C—Sample X1: Before sulphonation at different magnifications showing the hierarchic pore structure; Surface area=128.6 $m^2 g^{-1}$, FIGS. 11D-11F—Sample X2: After sulphonation with microwave at different magnifications; Surface area=242.7 $m^2 g^{-1}$. FIGS. 11G-11I—Sample X-3: Surface area=3.521 $m^2 g^{-1}$;

FIGS. 12A-12D illustrate nanoporosity in vinyl pyridine polyHIPE polymers showing the hierarchy of porosity; FIG. 12A—General view (X1000); FIG. 12B—Fracture surface of the thin pore showing nano-connectivity (X100,000); FIG. 12C—Fracture surface of a thick wall showing nano-pores and pore surface (X35,000); FIG. 12D—Detail of surface structure showing with the interior of the walls (X100,000);

FIGS. 13A-13F: Structure of a phosphoric acid-containing polyHIPE before microwave irradiation;

FIGS. 14A-14F: Structure of a phosphoric acid-containing polyHIPE after microwave irradiation (4 min);

FIGS. 15A-15E: Structure of a nitric acid-containing polyHIPE before microwave irradiation;

FIGS. 16A-16E: Structure of nitric acid-containing polyHIPE after microwave irradiation (4 min);

FIG. 17 illustrates a polyHIPE polymer with ammonium nitrate salt; and

Figure 18A:
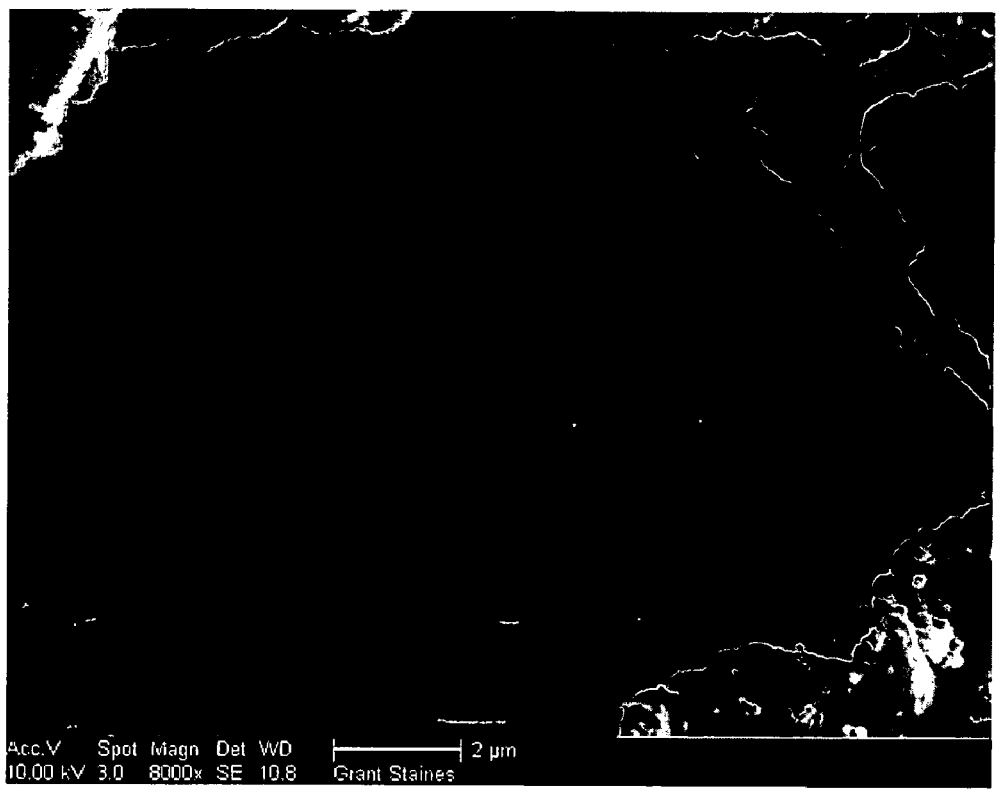
Figure 18B:
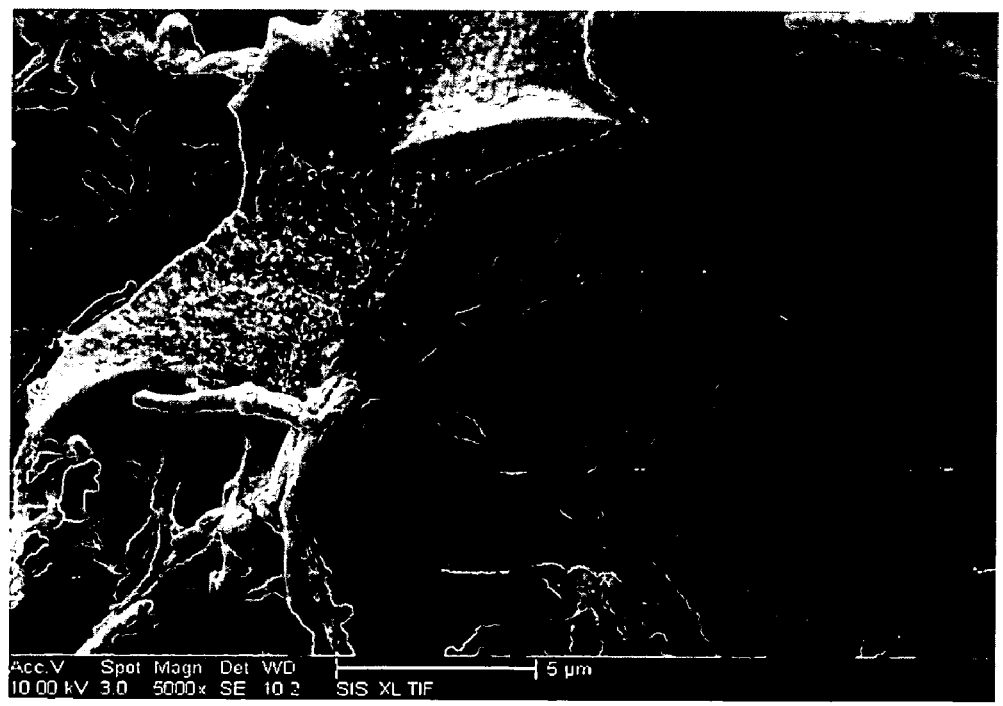

FIGS. 18A-18B: illustrates filamentous bacteria (*streptomyces coelicolor*) growing in a large pore size sulphonated polyHIPE polymer. Nanostructure of the pore wall is apparent; FIG. 18A—bacteria morphology in the pore; FIG. 18B—bacteria-wall interaction.

DETAILED DESCRIPTION

The following description is merely exemplary in nature and is not intended to limit the present disclosure, application, or uses.

Step (e) may comprise: irradiating the polyHIPE polymer with ultrasound (eg high power ultrasound).

In a preferred embodiment, step (e) comprises: irradiating the polyHIPE polymer with microwave irradiation. The microwave irradiation may be in the range 1200 to 3200 kW (eg 1400-3000 kW). Preferred is 1200 to 1600 kw (eg 1400 kW) for batch use and 2400 to 3200 kw (eg 3000 kW) for continuous use.

The temperature at which step (e) is carried out may be controlled. The temperature at which step (e) is carried out is typically maintained below the boiling point of the most volatile component of the first phase and second phase (eg below 80° C.).

Preferably step (e) is carried out with ambient cooling. For example, step (e) may be carried out in the path of forced ventilation (eg air circulation).

Preferably the first phase is continuous and the second phase is dispersed. The continuous phase may be a non-aqueous phase. The dispersed phase may be an aqueous phase. The emulsion may be an aqueous-in-oil emulsion or oil-in-aqueous emulsion. The continuous phase is generally the polymerisable phase and water (aqueous phase)-in-oil types of high internal phase emulsions (internal phase volume is typically above 70%) are preferred to oil-in-aqueous phase emulsions since the internal phase is removed to obtain the final porous material. In the water-in-oil type of HIPE, the continuous phase may be or contain a monomer, co-monomer, cross-linker or initiator and may also have diluents (eg fillers or functional species) such as hexane or toluene or chlorobenzene and/or ethyl chlorobenzene in the presence of a surfactant. The oil phase may further comprise a surfactant (eg Span 80).

Preferably the phase volume of the second (dispersed) phase in the emulsion is in the range 70-98%, particularly preferably 75-95%, more preferably 85-95 wt %.

The functionalised polyHIPE polymer may be a sulphonated, nitrated, chlorinated or phosphorylated polyHIPE polymer.

In a preferred embodiment, the functionalising agent is present in the second phase. For example, the functionalising agent may be dissolved or suspended in the second phase. Preferably the second phase is aqueous and the functionalising agent is present in aqueous solution.

In a preferred embodiment, the functionalising agent is added to the polyHIPE polymer. For example, the polyHIPE polymer may be soaked in a liquid functionalising agent (eg a solution of a functionalising agent). For example, the polyHIPE polymer may be injected with a liquid functionalising agent.

The term "polymerisation" herein is intended to include one or more of linear or branched polymerisation, linear or branched copolymerisation and cross cross-linking (or combinations thereof).

The polymerisable component may be one or more of the group consisting of high or low molecular weight, natural or synthetic monomers, co-monomers, oligomers, co-oligomers, macromonomers, polymers, pre-polymers, co-polymers and mixtures thereof. The term monomer/co-monomer is intended to cover single monomer/co-monomer units or a block of repeating monomer/co-monomer units (such as a dimer or trimer). Polymerisation is carried out under conditions of time and temperature and pressure suitable for the polymerisable component and familiar to those skilled in the art.

The polymerisable component may be in the presence of a cross-linking agent. The cross-linking agent may be selected from the group consisting of proteins, silicates, monomers, co-monomers, oligomers, co-oligomers, macromonomers, polymers and co-polymers. Specific examples include ethylene diacrylate, N—N'-diallyltartardiamine, N—N'(1,2 dihydroxyethane)-bis-acrylamide and N—N'—N"-triallyl citric-triamide which provide hydrolisable cross-linkages which are useful if the polyHIPE is required to be biodegradable. Preferred is divinylbenzene (DVB). Selection of a cross linking agent may be made with reference to the acceptable viscosity of the first and second phases for emulsifying and homogenising.

In an embodiment of the process of the invention, the polymerisable component comprises: one or more pre-polymers and partly cross linked pre-polymers, optionally together with an oil phase filler to increase oil phase volume and reduce effective viscosity.

By way of example, the polyHIPE polymer may be a polyvinyl, polyaryl, polyheterocycle (eg polyheteroaryl), oligoaryl (eg oligoheteroaryl) or oligoheterocycle-based polyHIPE polymer.

Where the polyHIPE polymer is a polyheterocycle or oligoheterocycle-based polyHIPE polymer, the functionalisable moiety is preferably an optionally ring substituted heterocyclic moiety (such as a 5- or 6-membered optionally ring substituted heterocyclic moiety), particularly preferably an optionally ring substituted heteroaromatic moiety. The optionally ring substituted heterocyclic moiety may contain one, two or three heterocyclic atoms which may be the same or different. Preferably the (or each) heterocyclic atom is selected from the group consisting of nitrogen, sulphur, oxygen, phosphorous and selenium, preferably the group consisting of nitrogen, oxygen and sulphur, particularly preferably the group consisting of nitrogen and sulphur. By way of example, the optionally ring substituted heterocyclic moiety may be selected from the group consisting of optionally ring substituted thiophene, furan, pyridine, imidazole, isothiazole, isooxazole, pyran, pyrazine, pyridazine, pyrazole, pyridine, pyrimidine, triazole, oxadiazole, pyrrole, indazole, indole, indolizine, pyrrolizine, quinazoline and quinoline.

The functionalisable moiety may be selected from the group consisting of an optionally substituted unsaturated acyclic moiety, an unsaturated monocyclic or polycyclic (eg fused polycyclic) hydrocarbon (eg carboaromatic) moiety which is optionally ring substituted and an unsaturated mono- or poly- (eg fused poly-) heterocyclic (eg heteroaromatic) moiety which is optionally ring substituted. Optional substituents may be chosen to enhance the electronic (or other) properties of the moiety (eg a substituent which has an electron withdrawing or donating effect).

Where the polyHIPE polymer is a polyaryl or oligoaryl-based polyHIPE polymer, the functionalisable moiety is preferably an optionally ring substituted carboaromatic moiety (or aryl moiety). For example, the functionalisable moiety may be selected from the group consisting of an optionally ring substituted phenyl, benzyl, anthracenyl, phenanthrenyl and napthalenyl moiety. Preferably the functionalisable moiety is an optionally ring substituted phenyl moiety (eg an o- or p-substituted phenyl moiety). The phenyl moiety may be ring substituted (eg o- or p-substituted) with a group which enhances its electronic properties (preferably a group which has an electron donating effect). A particularly preferred optionally ring substituted phenyl moiety is an optionally ring substituted styryl moiety (eg an o- or p-substituted styryl moiety).

In a preferred embodiment, the polymerisable component comprises a styrene monomer or a styrene co-monomer and a cross-linking agent (preferably divinyl benzene). A preferred styrene co-monomer is a styrene/alkyl alkylacrylate co-monomer (wherein each alkyl group is independently selected from the group consisting of a linear, branched or cyclic $C_{1-6}$-alkyl group such as methyl, ethyl, propyl, isopropyl, butyl isobutyl, pentyl or hexyl). Particularly preferred is a styrene/2-ethylhexylacrylate co-monomer which provides an advantageously flexible hydrocarbon chain. Elasticity of the polyHIPE polymer results in better mechanical shock absorbance and good attrition characteristics. Elasticity is also useful to enhance the water uptake capacity of the hydrophilic polymer through swelling. A preferred concentration of 2-ethylhexyl acrylate is 30 wt % or less, more preferably 15 wt % or less.

In a preferred embodiment, the polymerisable component comprises a 2-vinyl pyridine (2VP) monomer. 2-vinyl pyridine-containing polyHIPE polymers absorb oil (such as kerosene and hexane) and water or acidic/basic solutions rapidly. Typical water or oil adsorption levels of these polymers (containing typically 10 wt % 2-vinyl pyridine in the oil phase) is approximately 10 fold (by weight) for a 90% phase volume polyHIPE polymer. Due to this unique property and the presence of nitrogen in the polymer chain, 2VP-polyHIPE polymers can be used in several applications. This includes the simultaneous or separate removal of hydrocarbons and moisture removal from gases such as those produced in the gasification of biomass-waste (syngas) where dehumidification and tar removal are important before the syngas can be used. 2-VP polyHIPE polymers are also useful as support for mammalian cells and bacteria in tissue engineering and bioprocess intensification as illustrated in WO-A-00/34454 and WO2004/004880. Unlike hydrophobic bacteria support, these hydrophilic support systems can be used in 'solid state fermentation cultures' so that the moisture from air can be adsorbed by the support and utilized by the bacteria.

PolyHIPE polymers obtained from styrene and divinyl benzene (DVB) monomers with dilute acid (such as nitric, sulphuric or phosphoric acid) in the aqueous phase or 2-vinyl pyridine and styrene and divinyl benzene monomers yield nano-structured microporous polymers with nano-micro connectivity. Such structures are particularly desirable in mammalian or bacterial culture studies due to nano-connectivity, extended surface area as well as nano-pattern formed by the nano-particles. Nano-patterns appear to control the cell differentiation in 3D-connective cultures.

2-vinyl pyridine-containing polyHIPE polymers can be functionalized on the basis that the polymer can adsorb acids readily. A preferred embodiment of the process of the invention is one where an aqueous functionalising agent (eg sulphuric acid) is added to the 2-vinyl pyridine-containing polyHIPE polymer. Preferably the 2-vinyl pyridine-containing polyHIPE polymer is soaked in the aqueous functionalising agent (eg sulphuric acid). By way of example, sulphonated 2-vinyl pyridine-containing polyHIPE particles is encapsulated within 2-vinyl pyridine-containing polyHIPE polymer ie "skin-core" polyHIPE polymers may be produced in which the core is sulphonated 2-vinyl pyridine-containing styrene polyHIPE polymer and the outer skin is 2-vinyl pyridine-containing styrene polyHIPE polymer. Both the core and the skin are water adsorbent. In order to enhance the water adsorption capacity of the skin-core polyHIPE polymers, highly water adsorbent polymers (water capacity 30-100 fold by weight) may be saturated with water and dispersed into a 2-VP containing HIPE (typically the oil phase contains 10 wt % 2-VP, 70 wt % styrene, 8 wt % DVB and 12 wt % surfactant) and the HIPE allowed to polymerise to obtain a highly adsorbent bulk polymer.

In a preferred embodiment, the polymerisable component comprises: a styrene monomer and a 2-vinyl pyridine monomer. The 2-vinyl pyridine monomer may be present in an amount in the range 5-10 wt % of the first phase (or a molar equivalent thereof). The polyHIPE polymer produced by this embodiment is highly water adsorbent without a tendency for the emulsion to separate.

In a preferred embodiment, the polymerisable component comprises: (78-X-Y) wt % styrene monomer; X wt % 2-vinylpyridine monomer; and Y wt % 2-ethylhexylacrylate monomer. The balance may be surfactant and cross-linking agent.

The polymerisable component may be biodegradable. The polyHIPE polymer may be a poly(lactic acid), poly(glycolic acid), poly ε-caprolactam or polyacrylimide-based polyHIPE polymer.

The polymerisable component may be a protein or cellulose. The protein or cellulose together with an emulsifier may be dissolved in the first aqueous phase (water for proteins and Schweitzer's reagent $Cu(NH_3)_4(OH)_2$ for cellulose). The second continuous phase may be a hydrocarbon liquid. Crosslinking may be achieved by immersing the HIPE into a solution of glutaraldehyde (for proteins) or acid solution (cellulose).

The process may comprise introducing a modifier or inclusion prior to or subsequent to polymerisation. For example, a modifier may be introduced into the dispersed aqueous phase. Modifying agents and modification techniques are known in the art. The inclusion (eg functional inclusion) may be an organic or inorganic species within the pores or on (or as an integral part of) the walls of the pores of the polyHIPE polymer. Suitable inclusions include inter alia small particles (such as molecular particles or microscopic particles eg colloidal or submicron particles or nanoparticles), enzymes, bacteria, bacterial spores (eg in the micropores where they may activated in situ at the point of use), fibres (eg metal, carbon, polymeric or natural fibres), metal species and cells (eg animal or plant cells).

Steps subsequent to step (d) or (e) may include one or more of: removing surfactant, electrolyte or unreacted polymerisable component; further polymerisation; or inducing a reaction on the surface of the polyHIPE polymer or functionalised polyHIPE.

The functionalising agent may be adapted to functionalise the polyHIPE polymer with a functional group selected from: OR, COOR, COSR, COR, COO(COR), SR, SSR, $BHal_2$, $B(OH)_2$, $NR_2$, $NRNR_2$, $NR_3^+$, $CONR_2$, CHO, F, Cl, Br, I, CN, NO, $NO_2$, $P(O)_2H_2$, $P(O)_3H$, $P(O)_4$, $P(O)(OR)H_2$, $P(O)(OR)_2H$, $S(O)_2OR$ and $SO_4$, wherein each R is independently H; Hal; a metal species (such as a metal ion eg an alkali metal or alkaline earth metal ion); or an optionally hydroxylated or alkoxylated, linear or branched, saturated or unsaturated $C_{1-12}$-alkyl group (preferably $C_{1-6}$-group) optionally interrupted by or terminating in one or more cyclic (eg monocyclic) hydrocarbon (eg aromatic hydrocarbon) groups, acyclic heteroaromatic groups (such as oxygen or nitrogen) or heterocyclic (eg heteroaromatic) groups.

In a preferred embodiment, the functionalising agent is a sulphonating, nitrating, chlorinating or phosphorylating agent or a ligand.

The functionalised polyHIPE polymer is preferably hydrophilic. Thus the functionalising agent is preferably adapted to render the polyHIPE polymer hydrophilic. For this purpose the functionalising agent is adapted to functionalise the polyHIPE polymer with a polar functional group (eg a polar functional group from those listed above). Particularly preferred polar functional groups are $NO_2$ and $S(O)_2OH$.

The functionalising agent may contain (or be capable of releasing) an electrophile such as $F^+$, $Cl^+$, $Br^+$, $I^+$, $NO_2^+$, $NO_2^+$, $HSO_3^+$, $RCO^+$, $RSO_3^+$, $BHal_2^+$ (eg $BCl_2^+$) or $B(OH)_2^+$ (wherein R is as hereinbefore defined).

Preferred functionalising agents are water soluble. Particularly preferably the functionalising agent is a water soluble acid such as a strong organic acid (eg an aliphatic or aromatic acid such as a carboxylic acid) or an acid derivative thereof (such as an acid chloride) or a mineral acid. Although it may be desirable that the amount of acid is in excess, there may (in practice) be an upper limit to the concentration of acid which (if it is exceeded) causes the emulsion to become unstable resulting in no formation or breakdown of the polyHIPE polymer.

Preferred is an acid of formula $X[H]_p[O]_n[OH]_m$ (wherein X is S, N, P or an optionally hydroxylated or alkoxylated, linear or branched, saturated or unsaturated $C_{1-12}$-alkyl group (preferably $C_{1-6}$-group) optionally interrupted by or terminating in one or more cyclic (eg monocyclic) hydrocarbon (eg aromatic hydrocarbon) groups, acyclic heteroaromatic groups (such as oxygen or nitrogen) or heterocyclic (eg heteroaromatic) groups; p is 0, 1 or 2; m is 1, 2 or 3; and n is 1 or 2). Preferably p is 0. Preferably X is S, N or P.

Particularly preferred acids are sulphuric acid, nitric acid and phosphorous oxoacids (including $H_3PO_4$, $H_3PO_3$ and $H_3PO_2$ but preferably $H_3PO_4$), more preferably sulphuric acid and nitric acid, most preferably sulphuric acid.

Preferably the functionalising agent is a sulphonating agent. Typically the sulphonating agent is one which carries or which may be induced to release sulphur trioxide. An example is 1-protopyridinium sulphonate or sulphuric acid.

A preferred sulphonating agent is sulphuric acid. Dilute sulphuric acid is particularly preferred. Generally speaking, the amount of sulphuric acid present in the second (aqueous) phase or added to the polyHIPE polymer is such as to achieve a desired degree of sulphonation. Typically if the amount of sulphuric acid is about 25 wt % or less of the second (aqueous) phase (or a molar equivalent thereof), a stable emulsion is obtained with excess acid. If no excess acid is desirable, the amount of sulphuric acid is generally 10 wt % or less (eg 5-10%) of the second (aqueous) phase (or a molar equivalent thereof).

When sulphuric acid is used as the internal phase during step (c), the resulting polyHIPE polymer can have 'coalesce pores' which are dispersed within the primary pores. The size and concentration of these 'coalesce pores' increases if the acid concentration is increased until the emulsion becomes unstable as disclosed in WO2004/005355. Not disclosed in WO 2004/005355 is the fact that the walls of the pores (primary or coalesce pores) consist of nano-sized particles (typically 15 nm) with nano-sized (typically 10 nano meter hair-line cracks) which provide nanoscopic (nano-scale) connectivity. When these samples are irradiated with microwave, the nanoscopic connectivity is enhanced and they grow to form microscopic connectivity which appear as "blisters".

The typical surface area of polyHIPE polymers (with 90% internal phase volume) is about 10 $m^2/g$ which is based on crosslinked styrene-DVB. It is possible to produce very high surface area polyHIPE polymers using 50% DVB and 25% chlorobenzene and 25% chloroethylbenzene as the oil phase with aqueous phase containing $CaCl_2$ to stabilize the emulsion. At 80% phase volume, the surface area is 550 $m^2/g$. However, this material is very fragile and when it is sulphonated in particulate form, its mechanical properties further degrade. The use of concentrated sulphuric acid during thermally induced sulphonation reduces the surface area drastically whereas sulphonation of polyHIPE polymer containing dilute sulphuric acid increases the surface area due to the formation of nano-connectivity during micro-wave irradiation.

When sulphuric acid-containing polyHIPE polymers are subjected to microwave irradiation in step (e), the sulphonation time is typically reduced from hours under thermally induced reaction conditions to a few minutes (eg 1-10 minutes). The sulphonated polymer has extended surface area caused by the formation of nanoscopic cracks which can lead to the formation of micron-to-sub-micron size continuous cracks appearing as blisters. The sulphonated polymer is electrically conductive and contains active carbon and therefore can be used in applications where activated carbon is useful such as VOC adsorption.

A sulphonated polyHIPE polymer may be carbonised to obtain a micro-porous electrically conductive material. This may be used inter alia as a highly active gas/toxin absorber where the nanopores of the carbon are accessible through a network of micro-pores thus accelerating the adsorption process. This property is important when the toxin to be adsorbed is present in water.

Preferably the functionalising agent is a nitrating agent. A preferred nitrating agent is nitric acid. Nitric acid is generally used in the presence of a strong acid such as sulphuric acid, $HClO_4$ or $HF/BF_3$. Preferably the functionalising agent is a mixture of nitric and sulphuric acid (typically used at low temperature). Typically if the concentration of nitric acid is about 15 wt % or less of the second (aqueous) phase (or a molar equivalent thereof), a stable emulsion is obtained.

In one embodiment, after step (d) the sulphuric acid in the polyHIPE polymer is heated to below the sulphonation temperature to evaporate water and nitric acid is added (usually after cooling to for example 0° C.). Step (e) may then be performed at low temperature (eg 25° C.).

A preferred phosphorylating agent is phosphoric acid. The physical appearance and IR-spectroscopy indicates the presence of chemical changes as a result of phosphoric acid inclusion in the aqueous phase and subsequent microwave irradiation. Generally speaking, the amount of phosphoric acid present in the second (aqueous) phase is such as to achieve a desired degree of phosphorylation of the polyHIPE polymer. Typically if the concentration of phosphoric acid is about 25 wt % or less of the second (aqueous) phase (or a molar equivalent thereof), a stable emulsion is obtained. Although the polyHIPE polymer containing phosphoric acid before microwave irradiation and after repeated washing with water and iso-propanol is slightly hydrophilic (it adsorbs 50% water), it becomes hydrophobic after microwave irradiation and does not adsorb any water. Formation of carbon is also observed.

The functionalising agent may be an acylating agent. Typically the acylating agent is a Friedel-Krafts reagent such as a carboxylic acid anhydride or chloride in the presence of a Lewis acid catalyst such as $AlCl_3$.

Excess acid may result in the formation of coalescence pores when the primary pores coalesce during step (d). Thus when a high concentration of acid is used in the process of the invention, step (d) is preferably carried out whilst shaking (preferably until a viscous gel is formed).

Any excess acid may be desirably exploited in a further step of the process of the invention (such as in in situ formation of a salt ie a salt formed in the microporous structure of the functionalised polyHIPE polymer). In a preferred embodiment, the process of the invention further comprises:
(f) converting excess acid into an in situ salt.

The salt may be prepared in situ in step (f) by adding to the functionalised polyHIPE polymer a metal containing species (eg an alkali metal or an alkaline earth metal containing species). Preferred is a potassium, sodium or magnesium containing species. Preferred is a base such as sodium, potassium or magnesium hydroxide. The conversion to a salt may be in general achieved in a manner familiar to those skilled in the art with conventional reagents.

It may be possible to effect controlled release of the in situ salt. Preferably the in situ salt is a nitrate, sulphate or phosphate salt which can be useful when released slowly to fertilise plants. Slow release may be achieved by a hydrophobic barrier in which the fertilizer containing polyHIPE polymers is coated with known coating agents such as waxes and low molecular weight polymers.

A nitrated polyHIPE polymer is not hydrophilic. It is useful as a chemical intermediate for further functionalization. A mixture of sulphuric acid and nitric acid may be used as the functionalising agent in the process of the invention and microwave irradiation in step (e) results in nitration and sulphonation. In such a polyHIPE polymer, residual nitric acid may be neutralised using a hydroxide (eg ammonium hydroxide or potassium hydroxide) and therefore be suitable for agricultural applications (as fertilizer). However, in order to achieve high levels of fertilizer in polyHIPE polymer, it is preferable to obtain sulphonated polyHIPE polymer using sulphuric acid as the functionalising agent in the process of the invention (with very high water adsorption capacity which is achieved through swelling) and in subsequent steps: adsorb concentrated nitric acid and neutralize using a hydroxide. Another useful acid for adsorption in sulphonated polyHIPE polymer is phosphoric acid in order to obtain phosphate based fertilizers.

The functionalised polyHIPE polymer may itself additionally or alternatively be converted into a functionalised polyHIPE polymer salt. A sulphonated polyHIPE polymer salt placed in an organic solvent containing water advantageously absorb water selectively whilst the acid form of the polymer may absorb all of the solvent including water. This property can be used advantageously to selectively remove water from solvents such as alcohols containing water thereby avoiding distillation.

In a preferred embodiment, the process of the invention further comprises: treating the functionalised polyHIPE polymer with hypochloric acid or a salt thereof (eg an alkali metal hypochlorite such as sodium hypochlorite). This causes for example the black colour of a sulphonated material (due to carbon formation) to disappear, the porous material to be more absorbent and the polymer to become non-electrically conductive.

Step (d) may be carried out thermally and/or chemically. For example, the temperature of the emulsion may be elevated to a polymerisation temperature. Typically the polymerisation temperature is 60° C. or more. By way of example, when 2-vinyl pyridine is used in the oil phase, temperature is increased gradually from 40° C. to 50° C. and to 60° C. at 6 hour intervals.

For the purposes of carrying out step (d) chemically, the first (eg non-aqueous) phase or the second (eg aqueous) phase may contain a polymerisation initiator. For example, an aqueous phase may include sodium or (preferably) potassium persulphate or a non-aqueous phase may contain azobisisobutyronitrile, 1,1-azobis(cyclohexanecarbonitrile) or lauryl peroxide.

Step (d) may be followed by additional chemical steps such as inter alia condensation steps and by homogenisation (eg by agitation). Additives may be added to the first (eg non-aqueous) phase (for example to achieve coalescence if desired).

In a preferred embodiment, step (c) comprises: (c1) dosing the second phase (eg dispersed phase) into the first phase (eg continuous phase). Dosing rates are discussed in WO-A-00-34454.

Step (c) may comprise: (c2) mixing the second phase into the first phase (eg using a batch mixer). The dosing time and the method of dosing are both important when large pore size (above 30 micron) polymer is required. Suitable conditions have been disclosed in WO-A-00/34454. During dosing, mechanical mixing is present due to contacting of the phases and stirring.

Step (c2) may be carried out for example by stirring for a period sufficient to ensure emulsification. If large pore size is needed, both the dosing and additional mixing times should be short (eg within 1-3 minutes). If very small pores (less than 10 microns) are required, mixing rate and time should be both large (typically 10 minute dosing with 30 minute mixing). Step (c2) may be carried out at an elevated temperature to obtain large pore size. Homogenisation may be achieved over a controlled period by controlled deformation.

Dosing, emulsifying and homogenisation may be conducted at any suitable temperature depending on the desired pore size in the polyHIPE polymer. If the desired pore size is large, the preferred temperature is typically high but below the boiling point of the lowest boiling phase. An emulsification temperature of 60° C. or more generally results in polyHIPE polymers having pore size in excess of 60 micron. Above 60° C. there is generally a dramatic increase in pore size. Emulsification and subsequent polymerisation may be carried out at temperatures above the normal boiling point of the aqueous or continuous phase materials by increasing the pressure above atmospheric using closed continuous processing equipment.

The aqueous phase may include a stable inert electrolyte to permit step (d) to be carried out at an elevated temperature. The temperature range for preparing an emulsion with large pore size is typically 70-110° C.

The functionalised polyHIPE polymer may be in particulate, monolithic block or packed bed form.

In a preferred embodiment, the process of the invention further comprises: moulding the functionalised polyHIPE polymer into a desired shape (eg a porous disk) using a mould. This has the benefit of forming a skin to prevent attrition of the polymer during use in a packed bed.

If the functionalised (eg sulphonated) polyHIPE polymer is required in particulate form, step (e) is preceded by: dividing (eg chopping) particles of the polyHIPE polymer.

Alternatively if the functionalised (eg sulphonated) polyHIPE polymer is required in particulate form, step (d) comprises: (d') comminuting the partially polymerized—cross-linked polymer gel into the aqueous phase; and (d") mixing (eg gently mixing) the gelation to cause complete polymerisation.

Typically step (d') is carried out before a solid rigid polymeric structure has been formed by polymerisation in step (d").

The functionalised polyHIPE polymer or salt thereof has a pore size typically in the range 0.1-200 $\mu$m (for primary pores) and 50-5000 $\mu$m (for coalescence pores).

The functionalised polyHIPE polymer or salt thereof has an interconnect size typically in the range (10 nm-100 $\mu$m). Interconnect size is a function of primary pore size. In coalescence pores, interconnect size is highly irregular, while some pores are closed others have large interconnect size of about 50 $\mu$m.

The walls of the pores can have nano-porosity through a network of fine cracks connecting the opposite sides of the wall with the bulk of the wall structure. Such pores are typically 5-10 nm in width.

The functionalised polyHIPE polymer or salt thereof has a porosity typically in the range 70-95%.

The functionalised polyHIPE polymer or salt thereof may have a degree of functionalisation in excess of 10% of the functionalisable moieties. Typically the degree of functionalisation is in the range 20-90%.

Functionalised polyHIPE polymers prepared according to the invention are typically not dried excessively. Excessive drying results (in sulphonated polyHIPE polymer) in a reduction in the capacity for water absorption of the polymer as well as in a reduced rate of water uptake. The water absorption capacity of these polymers is typically 7-12 times their own weight (without swelling) and with swelling this increases to 21 times (phase volume=90%, pore size 40 $\mu$m) or to 35 times (phase volume=95%; pore size 40 $\mu$m) depending on the chemical composition, pore size and pore phase volume and the method of sulphonation.

The basic pore structure (type-1 pores) is determined at the emulsification stage mainly by the deformation (flow) history of the emulsion. The integrity of the type-1 pores may be retained during polymerisation and the interconnects are formed at this stage. Depending on the chemistry of the oil and aqueous phases, phase volume and the polymerisation conditions such as temperature and pressure, the interconnect size can be controlled in the range 0<d/D<0.5. Type-2 pores (coalescence pores) are obtained through controlled coalescence of the type-1 pores during polymerisation. The dispersed phase droplets in the emulsion of the polyHIPE polymer may be coalesced by the addition of water soluble polymers into the aqueous phase or by adding slightly hydrophilic oils (such as styrene oxide) to the oil phase or by elevating the concentration of monomers in the emulsion. The interconnect size in this case is the same as that of the type-1 pores which form a matrix incorporating the coalesced pores. However, due to the fact that the coalesced pores are very large compared with the basic pores, the d/D ratio is very small since the interconnect size is mainly dictated by the size of the primary pores.

Very small pore size emulsions (0.1 to 0.5 $\mu$m) may be obtained using very high deformation flow rate in which the flow is predominantly extensional and the emulsification temperature is as low as possible. Large pore size emulsions (0.5 to 300 µm eg approximately 200 µm) are obtained at high temperatures and just above the critical deformation rate below which the emulsion will fully or partially invert (for example to an oil-in water type system). The critical deformation rate may be determined by varying (for example) the rate of addition or rate of deformation during mixing for a given system. These emulsions should also be processed in a short time using predominantly shear flows. Very large pore emulsions (50 to 5000 µm, preferably to 500 µm) are obtained through controlled pore coalescence during polymerisation either 1) by adding into the aqueous (dispersed) phase a known amount of water soluble polymer or functionalising agents such as acids or 2) by adding 'filler' solutes into the continuous oil phase. If the concentration of additives is low, the result is polyHIPE polymers with pores in the range of 1-200 µm with some desired properties. If the concentration is above a certain value, the coalescence pores start to form and the pore size is dictated by the size of the pores before the start of coalescence, temperature of polymerisation and concentration, molecular weight and type of additive. Relatively small size coalesce pores (50-100 µm) can be obtained from the coalesce of very small primary pores (1-5 µm) but the physical appearance of the coalesce pores are distinctly different and readily distinguishable from the primary pores from which they derive.

Typically a stable emulsion with large pore diameter is obtained by minimising the intensity of mixing. Accordingly by means of dosing or homogeneous mixing, a stable emulsion may be obtained dispensing with the need for intense mixing. Homogenisation can be carried out in an external loop using a pump such as a gear pump or screw pump which can also be attached to a static or dynamic mixer. Types of static or dynamic mixers suitable for this type of homogenisation are described in U.S. Pat. No. 6,345,907 and WO-A-2004/004880.

The first phase and the second phase may be substantially fully immiscible. If there is slight miscibility, immiscibility may be restored using a surfactant such as a low hydrophile-lipophile balance surfactant.

Low power ultrasonic irradiation may be used in step (d) to prevent phase inversion and to obtain nano-structured polymers.

The functionalised polyHIPE polymers may usefully separate liquid hydrocarbons from gas (eg gas streams produced after the gasification of biomass or fossil fuel waste or combinations thereof). The liquid hydrocarbon may be a tar. The gas may contain one or more of carbon monoxide, hydrogen, methane, nitrogen and carbon monoxide. Typically the liquid-gas mixture is contacted with the functionalised polyHIPE polymer by passing it through an appropriate form of the functionalised polyHIPE polymer. Moisture and particulates (such as ash) may also be usefully removed from the gas stream.

The use of functionalised polyHIPE polymers in gas/liquid separation can be further intensified and made practical by incorporating the functionalised polyHIPE polymers into gas blowers and compressors. For example, the functionalised polyHIPE polymers may be incorporated into a barrier wall at or near to the exit(s) of the gas blower or compressor.

The functionalised polyHIPE polymer may be used as a demulsifier such as in the separation of an aqueous and non-aqueous phase of an aqueous/non-aqueous phase emulsion (eg the separation of oil and water from an oil in water or water in oil emulsion). This may be beneficial in inter alia offshore oil extraction, pharmaceutical or chemical manufacture, biotechnology and the nuclear fuel industry.

A hydrophilic functionalised polyHIPE polymer may be used as a water absorber. The water holding capacity may be controlled by changing the phase volume, pore size, degree of cross-linking and degree of functionalisation (eg sulphonation/nitration) in a manner familiar to those skilled in the art. Their mechanical strength and biodegradability may also be controlled.

The hydrophilic functionalised polyHIPE polymer may be used as a plant/cell/bacteria growth medium, as an ion exchange medium or in bioremediation. By virtue of their utility as water absorbers and ability to effect controlled release of functional groups, the hydrophilic functionalised polyHIPE polymers may be used in commercial agriculture and horticulture, landscaping, reforestation, land reclamation, plant transportation/storage and sports turf and golf courses. For example, the hydrophilic functionalised polyHIPE polymers contribute to water conservation/regulation and in seeking to reduce the frequency of irrigation, temperature regulation (insulation), aeration of soil, increased shell life of plants, reduced transplant shock (high survival rate), reduced leaching of nutrients, enhanced growth rate, delivery of plant starter fertiliser and reduced turf compaction and damage.

The hydrophilic functionalised polyHIPE polymer may be used as a 3-dimensional connective support for plant cells or mammalian cells or bacteria. Hydrophilicity of the polyHIPE polymer ensures the penetration of nutrients and cells into the support system without the application of pressure. Both the pore and interconnect sizes and surface chemical functionality of the pores are important in cell/bacteria cultures. In some cases, ionic surfaces are useful but in others they adversely affect the growth and differentiation of the microorganisms. Sulphonated polyHIPE polymers can provide negatively charged anionic surfaces while positively charged surfaces can be obtained from the chemical modification of the nitrated polymers. 2-vinyl pyridine polyHIPE polymers provide non-ionic hydrophilic surface.

Example 1

Sulphonation

Preparation of PolyHIPE Polymers

PolyHIPE polymers were prepared according to the technique described in EP-A-1183328 using the following internal (aqueous phase) and continuous oil phases.

Aqueous Phase: 10 wt % sulphuric acid solution

Oil Phase:

| Components ↓ | Oil Phase Composition 1 | Oil Phase Composition 2 |
|---|---|---|
| Styrene | 78 wt % | 70 wt % |
| Divinylbenzene | 8 wt % | 16 wt % |
| Span 80* | 14 wt % | 14 wt % |
| Laural peroxide+ | 1 wt % | 1 wt % |

*Non-ionic surfactant (sorbitan monooleate)
+Oil phase initiator (alternatively potassium persulphate can be used in the aqueous phase).

Emulsification was carried out at various temperatures (up to 80° C.) dependent on the desired pore size using a stirred stainless steel vessel (12 cm diameter) with a heating jacket. The oil phase was held in the mixing vessel and the aqueous phase heated separately to a specific temperature and then delivered by two peristaltic pumps to four feed points at a constant rate for the duration of the dosing time. Mixing was carried out using three flat impellers at 90 degrees to each other so that the final level of the emulsion was about 1 cm above the top impeller. The lowest impeller on the stirrer shaft was as close to the bottom surface of the vessel as possible. In each experiment, the amount of internal phase was typically 225 ml. Unless stated otherwise, the volume fraction of the internal phase was 80 v %.

The processing conditions were: dosing rate (unless states otherwise) of the aqueous phase is 5 minutes, impeller speed (O)=300 rpm and total mixing time (including the dosing time) variable in order to achieve the desired pore size. After emulsification, the emulsion was transferred to cylindrical containers (26 mm internal diameter) and the emulsion was polymerized at 60° C. for 8 hours. Samples of polyHIPE polymer were cut into discs which were 26 mm in diameter and 3 mm in thickness.

Sulphonation Method 1 (FIGS. 3A and 3B)

PolyHIPE polymer samples containing 10 wt % sulphuric acid in the aqueous phase were placed in a pre-heated oven and allowed to sulphonate at various temperatures above 150° C. over different time spans. Table 2 illustrates the results of a variation in the degree of sulphonation as a function of time and sulphonation temperature. As seen from Table 2, the degree of sulphonation increases initially with time but then reaches a plateau or decreases. In these samples, either potassium persulphate (in the aqueous phase) or laural peroxide (in the oil phase containing the monomers and surfactant) were used (see Table 3).

TABLE 2

Variation of the degree of sulphonation as a function of time at various sulphonation temperatures with initial 10% sulphuric acid.

| Time | Degree of Sulphonation (%) | | |
|---|---|---|---|
| (min) | 150° C. | 180° C. | 200° C. |
| 30 | 10 | 4.9 | 7.0 |
| 45 | 15 | — | 7.4 |
| 60 | 9 | 11 | 39 |
| 75 | 10 | 28 | 54 |
| 90 | 11 | 47 | 58 |
| 120 | 26 | 51 | 67 |
| 150 | 40 | 53 | 65 |
| 180 | 56 | 54 | 65 |

TABLE 3

The effect of initiator on the degree of sulphonation using water or oil soluble initiators.
180° C.

| Aq Phase initiator (K persulfate) | | Oil Phase initiator (L Peroxide) | |
|---|---|---|---|
| Time | Degree of Sulphonation | Time | Degree of Sulphonation |
| 30 | 9.3 | 30 | 4.9 |
| 60 | 44 | 60 | 11 |
| 90 | 44 | 75 | 28 |
| 120 | 41 | 90 | 47 |
| 150 | 44 | 120 | 51 |
| 180 | 44 | 150 | 53 |
|  |  | 180 | 54 |

Sulphonation Method 2 (FIGS. 3A and 3B)

In order to accelerate the degree of sulphonation and increase the plateau value of sulphonation, samples were heated at 80° C. under vacuum until they lost 65% of water thus concentrating the acid in the samples to 62%. Sulphonation was then carried out as described above. The results are shown in Table 4.

TABLE 4

Comparison of the sulphonation rates of pre-treated (drying) with untreated polyHIPE polymers containing 10 wt % acid in the aqueous phase.
T = 180° C.

| Dried to lose 65% weight | | No drying | |
|---|---|---|---|
| Time | Degree of Sulphonation | Time | Degree of Sulphonation |
| 15 | 7.4 | 30 | 4.9 |
| 45 | 61 | 60 | 11 |
| 90 | 67 | 75 | 28 |
| 120 | 67 | 90 | 47 |
| 165 | 66 | 120 | 51 |
|  |  | 150 | 53 |
|  |  | 180 | 54 |

When the acid in the polymer is concentrated, the sulphonation time decreases compared with dilute acid sulphonation and the plateau level is raised.

When sulphuric acid containing polyHIPE polymer is sulphonated according to methods 1 and 2, it not only becomes sulphonated and therefore hydrophilic but also electrically conductive and black (charring). The polymers absorb water and swell but swelling is not pronounced and can be controlled. If swelling is large, sulphonated polyHIPE polymer can develop cracks due to internal stresses. Crack formation and subsequent disintegration are also inevitable when sulphonated PHP is carbonised. The controlled swelling of the sulphonated PHPs prepared according to methods 1 and 2 make such materials desirable in several applications.

Sulphonation Method 3

If PolyHIPE polymers containing 10 wt % acid are microwave irradiated, they sulphonate rapidly within minutes. Under steady state conditions, the sulphonation temperature rises during continuous irradiation and therefore temperature control is necessary. This can be achieved through air circulation. It is possible to keep the sulphonation temperature low by periodic exposure to air circulation. Experiments were conducted at an average temperature of 80° C. The results are shown in Table 5. The samples which were irradiated with microwaves whilst still containing dilute acid (10%) are coded as MWD. Since microwave irradiation initially evaporates water, polymers containing less than 10% acid can also be used.

Sulphonation Method 4

The sulphonation rate was further accelerated by concentrating the acid within the pores of the polyHIPE polymer. However, the increase in the rate of sulphonation is not significant in absolute terms since the sulphonation time in both cases is already small. The results of microwave sulphonation are shown in Table 5. Dried samples are coded as MWC in this table.

TABLE 5

Microwave irradiation of sulphuric acid-containing PolyHIPE polymers

| Sample No | MW irradiation time (min) | Degree of sulphonation (min) | Free acid remaining (% of initial) |
|---|---|---|---|
| MWC-11 | 1 | 13 | 14 |
| MWC-12 | 2 | 41 | |
| MWC-13 | 4 | 73 | 7 |
| MWC-14 | 6 | 54 | |
| MWC-15 | 10 | 61 | |
| Samples not dried | | | |
| MWD-7 | 4 | — | |
| MWD-8 | 6 | 56 | |
| MWD-9 | 10 | 54 | |

After sulphonation, the product can be neutralised with a suitable base depending on the application. For example, if the removal of moisture from gases is intended, the product can be neutralised with $Mg(OH)_2$ to produce $MgSO_4$ which has a large crystal water associated with it. In agricultural applications, potassium or ammonium salts are preferred.

Sulphonation Method 5

The composition of the oil and aqueous phases of a polyHIPE polymer are given below:

Oil Phase:

Styrene Monomer: (78-X-Y) %

2-Vinyl pyridine monomer: X %

2-Ethylhexyl acrylate monomer: Y %

Divinyl benzene (cross linking agent): 8%

Sorbitan mono-monooleate (Span 80 non-ionic surfactant): 14%

Aqueous Phase: Water containing 1% potassium persulphate.

PolyHIPE Polymers containing 4 or 8% 2-vinyl pyridine in the aqueous phase were prepared as described previously. The phase volume of the aqueous phase was 90%. After emulsification, polymerisation was carried out in 3 stages:

8 hours at 40° C., 8 hours at 50° C. and 8 hours at 60° C.

The polymers were dried in the oven for 2 hours at 60° C. and then soaked in 10% sulphuric acid. Samples in the form of disks 4 mm thick and 25 mm in diameter were then sulphonated either thermally at 180° C. for 150 minutes or by microwave irradiation without drying.

In both cases, sulphonation took place to give material properties which were the same as described above (ie carbon formation, electrical conductivity). However there were no blisters on the walls of the microwave irradiated materials indicating that these blisters are the result of sulphuric acid inclusion within the aqueous phase at the emulsification stage.

Characterisation of the Sulphonated Materials from Methods 1-5

Scanning Electron Microscopy

Scanning Electron Microscopy was used to determine the micro-structure of the sulphonated PolyHIPE Polymers and to carry out micro-analysis for chemical composition.

Functionalisation

The sulphonated polyHIPE polymers prepared by methods 1-5 are electrically conductive even after being washed and dried. They do not change their black colour even after washing. However, if they are soaked in hypochloric acid or its salt (sodium hypochlorite), they become oxidised and the degree of substitution increases to over 90%. They are still water absorbent and swell in water. The structure of the sulphonated polyHIPE polymers from Method 4 treated in this manner is illustrated in FIGS. 7A, 7B and is similar to the sulphonated form but the blisters appear to collapse.

Determination of Pore and Interconnect Size Distributions

From the SEM images were obtained the pore and interconnect size of the polyHIPE polymers. Images from each polymer sample were reproduced on an A4 piece of paper to show 100 pores. The diameters of 100 pores and interconnects were measured by the program SEMafore. The average of the pores and interconnects were calculated from the raw data. This was then taken as the pore and interconnect size of each polymer. This was carried out three times on independent samples from each batch of polymers.

Surface Area Determination

Determination of surface area was conducted using the dynamic triple point B.E.T. analysis method (30/70 $He/N_2$).

Example 2

Encapsulation of Sulphonated PHP or Water Adsorbent Polymer Powders

A solid 2-vinyl pyridine polyHIPE polymer (8% 2-vinyl pyridine) with 90% aqueous phase volume was prepared. After drying, it was injected with a small amount of concentrated sulphuric acid. The polymer was then microwave irradiated by increasing the temperature above 60° C. (when concentrated acid was used) or 180° C. (when 10% acid was injected). The resulting polymer had a sulphonated core and water adsorbent skin which prevents the escape of the inner core.

In another encapsulation technique, small sulphonated polyHIPE polymer particles (size range 40-100 microns with phase volume of 90%) were allowed to be saturated with water to form a paste-like material. An emulsion was prepared using 75% aqueous phase (with potassium persulphate as the initiator) and 25% oil phase containing 8% 2-vinyl pyridine, 70% styrene, 8% DVB (cross linking agent) and 14% Span 80. To this emulsion was added water saturated sulphonated PHP particles in the form of paste so that the volume of the emulsion was doubled thereby increasing the phase volume to 85%. It was mixed and the monomers were allow to polymerise at three consecutive temperatures of 40° C., 50° C. and 60° C. for 8 hours each. The resulting material contained regions of highly adsorbent sulphonated polyHIPE particles which were encapsulated by non-ionic adsorbent polyHIPE. The method was also applied to other non-ionic water adsorbents (in the form of powder) which contained 100 g water/g polymer.

Example 3

Nitration

Nitration of small polyHIPE polymer particles can be carried out using a mixture of concentrated sulphuric acid and concentrated nitric acid. However, monolithic materials may not be prepared in this way. Instead, either dilute nitric acid (up to 20%) or a mixture of dilute nitric and sulphuric acid (typically 10% acid) may be used. The resulting polymer with dilute acid can then be microwave irradiated. FIGS. 8a,b illustrate the structure of nitrated polyHIPE polymer (MW irradiation time=10 min) which initially contained 10% nitric acid.

When EDAX analysis was conducted on this material, atomic ratios were found to be:

Carbon: 62.0%; Oxygen: 10.2%; and Nitrogen: 27.8%. Note that because this sample was not electrically conductive, it was carbon coated.

A 50-50 mixture of sulphuric acid (10%) and nitric acid (10%) solutions was used as the internal phase and the resulting polymer was micro-wave irradiated for 4 minutes. The material became sulphonated outside and nitrated inside to form a core-shell structure. In the region where it is coloured black, the structure has some blisters but in the region which does not conduct electricity there were no blisters. EDAX analysis yielded:

Sulphonated region: Carbon: 26.5%; Oxygen: 40.7%; Nitrogen: 18.0%; Sulphur 14.8%.

Nitrated region: Carbon: 43.3%; Oxygen: 30.1%; Nitrogen: 19.0%; Sulphur: 7.6%.

Example 4

Microwave Irradiation of Phosphoric Acid Containing Polymers

PolyHIPE polymers with 78% styrene, 8% DVB and 14% Span 80 as the oil phase were prepared using 10 wt % phosphoric acid ($H_3PO_4$). The polymer was then microwave irradiated for 4 minutes, washed and dried. After polymerization, the physical appearance of the polyHIPE polymer was different even after prolonged washing. IR-spectroscopy indicated the presence of new bands which could not be identified. After microwave irradiation, some of these bands disappeared. However, both EDAX and IR-spectroscopy do not indicate any phosphorylation. Nevertheless, the presence of phosphoric acid in the aqueous phase create the nano-structured architecture encountered with sulphuric or nitric acid.

Example 5

Effect of Sulphonation on the Nano-Structural Characteristics of Sulphonated polyHIPE Polymers Sulphuric acid (10%) containing polystyrene/divinyl benzene polyHIPE polymers were prepared using styrene (78%) and DVB (8%) as monomers and 14% Span 80 as surfactant. Phase volume was 80%. Dosing time was 5 minutes with additional mixing time of 15 minutes. After polymerisation, some of the samples were microwave irradiated (4 min) while the others were thermally sulphonated at 180° C. for 180 minutes. All samples were washed in water and isopropanol for SEM examination. Fractured samples were gold coated for high magnification examination. SEM examination results are shown in FIGS. 9a-d for microwaved samples and in FIGS. 10a-b for the thermally sulphonated sample.

It is clear from FIGS. 9 and 10 that the concentration of nano-cracks increases with microwave irradiation and when they combine in a circular manner, they give the impression of blisters which can also drop to form microscopic interconnects. Nano-cracks are also present within the bulk of the walls and they make the connectivity of the pore surfaces with the microscopic pores. Blisters are not present in the samples where sulphonation was thermally induced. The concentration of nano-cracks is higher in the microwaved samples than in the thermally induced sulphonation samples as shown in FIG. 10.

Example 6

Effect of Sulphonation on the Surface Area and Nano-Structural Characteristics of Sulphonated polyHIPE Polymers The surface area in polyHIPE polymers ranges from 1-10 $m^2/g$. In order to obtain high surface area polymers, the following formulation was used:

Oil phase: 50% DVB, 25% (2-Chloroethyl)benzene (CEB) and 25% Chlorobenzene (CB)

Aqueous Phase: 1.0% Potassium Persulfate and 5% $H_2SO_4$

Phase volume=85%

Dosing time=60 minutes with no additional mixing.

Polymerization is at 60° C. for 24 hours.

After polymerization, 3 different samples were prepared. They are coded as X-1, X-2 and X-3. The SEMs and surface area of these samples were obtained.

Sample X-1: Washed and dried.

Sample X-2: Irradiated in microwave for 8 minutes and then washed and dried.

Sample X-3: Irradiated in microwave for 2 minutes (in order to have low level sulphonation so that it could adsorb sulphuric acid), soaked in concentrated $H_2SO_4$ for 2 hours, sulphonated in a conventional oven for 24 hours at 60° C., neutralised with NaOH, washed and dried.

Surface area measurements indicate that original sample X-1 has a surface area of 128.6 $m^2/g$ and after irradiation (sample X-2) it increases to 242.7 $m^2/g$. If concentrated sulphuric acid is used for sulphonation (sample X-3), the surface area decreases to 3.52 $m^2/g$.

SEM examination of these three samples (FIGS. 11a-i) indicates the presence of nano-cracks in X-1 and X-2 together with fine nano-particulate surface and wall structures. However, after concentrated sulphuric acid treatment, surface area decreases drastically and this reduction is reflected in the fine structure of the polymer. In X-3, nano-sized particles appear to have fused together hence they no longer contribute to the surface area.

Example 7

Effect of 2-vinyl Pyridine Co-Monomer on the Nano-Structural Characteristics of polyHIPE Polymers 2-vinyl pyridine containing polyHIPE polymers are unique because they are biphylic (ie they can take up water as well as oil such as kerosene or hexane). They also provide nano-connectivity across the pore walls which is very important when such polymers are used as support for cells or bacteria in tissue engineering and bioprocess or agro-process intensification. The following compositions were used in the preparation of 2-vinyl pyridine containing polyHIPE polymers.

Oil Phase: 70% Styrene, 8% DVB (Divinylbenzene), 14% Span 80, 8% Vinyl pyridine

Aqueous Phase: 1% Potassium persulphate in distilled water

Phase volume=85%, Dosing time=5 minutes, Additional mixing time=0.

Polymerisation Temperature=40° C. to 50° C. to 60° C. at 8 hour intervals.

SEM examinations are shown in FIG. 12A-D. It is clear that the walls contain nano-pores and they are interconnected. The fine structure of the walls and the surface is very similar to those obtained when acids were used in the internal phase.

Example 8

Dehumidification and Cleaning of Gases

Dehumidification is important in gas production (eg in natural gas or gases produced through gasification). The removal of water from the gasification gas is important when the gas is used in internal combustion engines.

Sulphonated polymers prepared according to the process of the invention which adsorb 50 times their own weight were placed in textile bags (which readily adsorbed water) and sealed. This was necessary because of the need for confinement. Even if the polymer swelled fully, it would only fill half of the bag volume after water adsorption. In order to provide direct contact with the wet/high hydro-carbon containing gas stream, we also used sulphonated polyHIPE polymers with 3 different water adsorption capacity. These polymers were also used used in the adsorption of kerosene from air to illustrate the potential of these polymers. In all cases, sulphonated or 2-vinyl pyridine-containing polyHIPE polymer (4% 2-vinyl pyridine) was prepared and cut into small cubes. These materials were filled into a glass tube. Air or carbon dioxide was passed through and saturated with water. This gas was then passed through the packed bed followed by condensation of water after cooling the gas to 0° C. Gas flow rate was measured. After a certain length of time, the experiment was stopped and the weight increase of the packing material was determined. It was found that the humidity could be lowered to 4% from the initial level of 12%. These materials can be regenerated by increasing the temperature to above 80° C. to remove adsorbed water.

TABLE 6

Removal of moisture from air using sulphonated or 2-vinyl pyridine polymers as measured from the reduction of air humidity (initially at 12%). Details of the polymers are given below. Flow rate, bed temperature and initial humidity of the gas stream in these experiment were kept constant at 0.2 m$^3$/hr, 40° C. and 12% respectively.

| | Polymer type | | | |
|---|---|---|---|---|
| | 2 VP PHP | SPHP-1 | SPHP-2 | SPHP-3 |
| Weight of polymer used (gr) | 4.7 | 4.6 | 4.5 | 10 |
| Final Humidity (%) | 4.5 | 5.3 | 4.0 | 5.6 |

2 VP PHP→74% Styrene, 4% 2VP, 14% Span 80, 8% DVB in the oil phase. 1% Potassium persulfate in aqueous phase. Phase volume=95%. Water uptake capacity=10 times own weight.

SPHP-1→78% Styrene, 14% Span 80, 8% DVB in the oil phase. 1% Potassium persulfate and 5% Sulphuric acid in the aqueous phase. Phase volume=90% (mixing after dosing) MW treated. Water uptake capacity=8 times own weight.

SPHP-2→78% Styrene, 14% Span 80, 8% DVB in the oil phase. 1% Potassium persulfate and 5% Sulphuric acid in the aqueous phase. ϕPhase volume=90% (No mixing after dosing) MW treated. Water uptake capacity=28 times own weight.

SPHP-3→Powdered form of sulphonated PHP. Contained in a water permeable filter bag. Water uptake capacity=50 times own weight.

Kerosene uptake capacity of the polymers was equal to their water uptake capacity. Under similar conditions using SPHP-1 polymers experiments were conducted to see kerosene removal capacity of the polymers. During the experiment the flow rate was 0.20 m$^3$/hr and the kerosene content in the gas was 23 gr/m$^3$. The polymer efficiency in the experiment was calculated as: Polymer Efficiency=$(W_{final}-W_{initial})/W_{initial}$=3.2

$W_{initial}$ and $W_{final}$ are the initial and final weight respectively of the polymer used in the experiments to remove kerosene from air.

Example 9

Phosphoric Acid-Containing polyHIPE Polymers

Continuous Oil Phase:

70 wt % Styrene 15 wt % Divinyl benzene 15 wt % Span 80

Dispersed Aqueous Phase:

0.5 wt % Potassium persulphate 15 wt % phosphoric acid

Phase Volume: 85% void

Dosing Time: 10 minute

Additional Mixing Time: 20 minutes

Volume of the total solution: 300 ml

Mixing Vessel Diameter: 12 cm

Impeller Number: 3

Impeller Diameter: 9 cm

SERIES A9A: 15% phosphoric acid containing PS+DVB polymer. It is washed and dried. These show that the walls are made of small particles ca. 20 nm diameter. They are not very clear. Gold coated Samples a9a-1 to a9a-4 primary pores; A9A-5 to A9A-9 Coalescence pores.

SERIES A9B: 15% phosphoric acid containing PS+DVB polymer. It is then microwaved for 4 minutes within closed plastic tubes which after a while leaks due to pressure build up. It is then washed and dried. Gold coated Fine structure is more obvious as if acid etching. Cracks on the surfaces of both coalesce and primary pores. A9B-1 to A9B-6 Primary pores; A9B-7 to A9B-10 coalescence pores. Fine cracks appear after microwave irradiation.

FIGS. 13 and 14 show the structure of the polyHIPE polymer before and after irradiation.

IR spectroscopy indicate no substantial chemical changes in the polymer after microwave irradiation.

Example 10

Nitric Acid-Containing PolyHIPE Polymers

Continuous Oil Phase:

70 wt % Styrene 15 wt %

Divinyl benzene 15 wt %

Span 80

Dispersed Aqueous Phase:

0.5 wt % Potassium persulphate 15 wt % Nitric acid

Phase Volume: 85% void

Dosing Time: 10 minute

Additional Mixing Time: 20 minutes

Volume of the total solution: 300 ml

Mixing Vessel Diameter: 12 cm

Impeller Number: 3

Impeller Diameter: 9 cm

SERIES A9A: 15% nitric acid containing PS+DVB polymer. It is washed and dried. Gold coated SERIES A9B: 15% nitric acid containing PS+DVB polymer. It is then microwaved for 4 minutes within closed plastic tubes which open up due to pressure build up. It is then washed and dried. Gold coated.

FIGS. 15 and 16 show the structure of the polyHIPE polymer before and after irradiation.

Nitrated samples yield nano-structure in the form of walls made from particles which provide connectivity with the micron-sized pores. After microwave irradiation, the particulate nature of the pore walls and connectivity increases. IR spectra indicate nitration.

Example 11

Salt Deposition Within a Sulphonated polyHIPE Polymer

In order to increase the salt (such as ammonium nitrate) within the pores of a polyHIPE polymer, high water adsorbing capacity sulphonated polymers were prepared which have relatively large size primary pores (above 35 microns). Water adsorption capacity of these polymers also increases with increasing phase volume. A 95% phase volume polymer was prepared with the following internal and continuous oil phase compositions and processing conditions:

Oil phase: 78% styrene; 8% DVB and 14% Span 80.

Aqueous phase: 5% sulphuric acid and 1% potassium persulphate.

Dosing time=1 minute Additional mixing time=0; Impeller speed during dosing=300 rpm.

Polymerisation was conducted at 60° C. for 8 hours followed by soaking in concentrated sulphuric acid (98%) and subsequent microwave irradiation for 2 minutes. They were then neutralized with ammonium hydroxide. This material can be used for the delivery of nitrogen to plants or it can be used as support for bacteria after removing of the excess salt from the polymer.

The resulting washed polymer can take up water 35 times of its own weight and swells in the process. These highly swelling polymers can be immersed in concentrated acid and subsequently neutralized with a suitable base to obtain a desired salt within the pores for slow release. FIG. 17 illustrates the appearance of polyHIPE polymer with ammonium sulphate salt within its pores.

Example 12

High Water Adsorbing Capacity PolyHIPE Polymer as Bacterial Growth Media

The resulting washed polymer from Example 11 be used to culture bacteria under solid state fermentation conditions where no water is passed through the fermentation media or when large pore size is needed. Another advantage of this material is that the penetration of water does not require any pressure application. FIG. 18 illustrates the growth of a filamentous bacteria within the pores of this material.

What is claimed is:

1. A process for preparing a functionalised polyHIPE polymer comprising:
   (a) obtaining in a first phase a polymerisable component, said polymerisable component comprising a functionalisable moiety;
   (b) obtaining a second phase;
   (c) forming a high internal phase emulsion of the first phase and the second phase, wherein the first phase and the second phase are at least partially immiscible;
   (d) causing polymerisation of the polymerisable component into a polyHIPE polymer, wherein a functionalising agent is present in the first phase or second phase or the first phase and the second phase or is added to the polyHIPE polymer; and
   (e) subjecting the polyHIPE polymer to intensified internal heating to cause functionalisation of at least a proportion of the functionalisable moieties.

2. The process according to claim 1 wherein step (e) comprises irradiating the polyHIPE polymer with microwave irradiation.

3. The process according to claim 2 wherein the temperature at which step (e) is carried out is maintained below the boiling point of the most volatile component of the first phase and second phase.

4. The process according to claim 2 wherein step (e) is carried out with ambient cooling.

5. The process according to claim 2 wherein step (e) is carried out in the path of forced ventilation.

6. The process according to claim 1 wherein the first phase is continuous and the second phase is dispersed.

7. The process according to claim 6 wherein the continuous phase is a non-aqueous phase.

8. The process according to claim 6 wherein the dispersed phase is an aqueous phase.

9. The process according to claim 6 wherein the continuous phase is an oil phase.

10. The process according to claim 1 wherein the phase volume of the second phase in the emulsion is in a range from about 70 to about 98%.

11. The process according to claim 1 wherein the functionalised polyHIPE polymer is a sulphonated, nitrated, chlorinated or phosphorylated polyHIPE polymer.

12. The process according to claim 1 wherein the functionalising agent is present in the second phase.

13. The process according to claim 12 wherein the second phase is aqueous and the functionalising agent is present in aqueous solution.

14. The process according to claim 1 wherein the functionalising agent is added to the polyHIPE polymer.

15. The process according to claim 14 wherein the polyHIPE polymer is soaked in a liquid functionalising agent or the polyHIPE polymer is injected with a liquid functionalising agent.

16. The process according to claim 1 wherein the functionalisable moiety is an optionally ring substituted phenyl moiety.

17. The process according to claim 16 wherein the optionally ring substituted phenyl moiety is an optionally ring substituted styryl moiety.

18. The process according to claim 1 wherein the polymerisable component comprises a styrene monomer or a styrene co-monomer and a cross-linking agent.

19. The process according to claim 18 wherein the styrene co-monomer is a styrene/alkyl alkylacrylate co-monomer (wherein each alkyl group is independently selected from the group consisting of a linear, branched or cyclic $C_{1-6}$-alkyl group such as methyl, ethyl, propyl, isopropyl, butyl isobutyl, pentyl or hexyl).

20. The process according to claim 18 wherein the styrene co-monomer comprises a styrene/2-ethylhexylacrylate co-monomer.

21. The process according to claim 1 wherein the polymerisable component comprises a 2-vinyl pyridine monomer.

22. The process according to claim 21 wherein the polymerisable component comprises a 2-vinyl pyridine monomer and a styrene monomer.

23. The process according to claim 22 wherein the polymerisable component comprises:
    about (78-X-Y) wt % styrene monomer;
    about X wt % 2-vinylpyridine monomer; and
    about Y wt % 2-ethylhexylacrylate monomer.

24. The process according to claim 1 wherein the functionalising agent is adapted to functionalise the polyHIPE polymer with a functional group selected from the group consisting of OR, COOR, COSR, COR, COO(COR), SR, SSR, $BHal_2$, $B(OH)_2$, $NR_2$, $NRNR_2$, $NR_3^+$, $CONR_2$, CHO, F, Cl, Br, I, CN, NO, $NO_2$, $P(O)_2H_2$, $P(O)_3H$, $P(O)_4$, $P(O)(OR)H_2$, $P(O)(OR)_2H$, $S(O)_2OR$ and $SO_4$,
    wherein each R is independently H; Hal; a metal species; or an optionally hydroxylated or alkoxylated, linear or branched, saturated or unsaturated $C_{1-12}$-alkyl group optionally interrupted by or terminating in one or more cyclic hydrocarbon groups, acyclic heteroaromatic groups or heterocyclic groups.

25. The process according to claim 1 wherein the functionalising agent comprises a sulphonating, nitrating, chlorinating or phosphorylating agent or a ligand.

26. The process according to claim 1 wherein the functionalising agent is adapted to functionalise the polyHIPE polymer with a polar functional group.

27. The process according to claim 26 wherein the polar functional group comprises $NO_2$ or $S(O)_2OH$.

28. The process according to claim 1 wherein the functionalising agent comprises an organic acid or an acid derivative thereof or a mineral acid.

29. The process according to claim 28 wherein the acid is of formula $$X[H]_p[O]_n[OH]_m$$

wherein X is S, N, P or an optionally hydroxylated or alkoxylated, linear or branched, saturated or unsaturated $C_{1-12}$-alkyl group optionally interrupted by or terminating in one or more cyclic hydrocarbon groups, acyclic heteroaromatic groups or heterocyclic groups;
p is 0, 1 or 2;
m is 1, 2 or 3; and
n is 1 or 2.

30. The process according to claim 29 wherein the acid comprises at least one of the group consisting of sulphuric acid, nitric acid and phosphorous oxoacids.

31. The process according to claim 1 wherein the functionalising agent comprises a sulphonating agent.

32. The process according to claim 31 wherein the sulphonating agent comprises sulphuric acid.

33. The process according to claim 32 wherein the amount of sulphuric acid is about 10 wt % or less of the second phase (or a molar equivalent thereof).

34. The process according to claim 1 wherein the functionalising agent comprises a nitrating agent.

35. The process according to claim 34 wherein the nitrating agent is nitric acid, optionally in the presence of sulphuric acid, $HClO_4$ or $HF/BF_3$.

36. The process according to claim 1 wherein the functionalising agent comprises phosphoric acid.

37. The process according to claim 1 further comprising: (f) converting excess acid into an in situ salt.

38. The process according to claim 1 further comprising:
    treating the functionalised polyHIPE polymer with hypochloric acid or a salt thereof.

* * * * *

UNITED STATES PATENT AND TRADEMARK OFFICE
CERTIFICATE OF CORRECTION

PATENT NO.         : 7,820,729 B2                                    Page 1 of 1
APPLICATION NO.    : 11/403996
DATED              : October 26, 2010
INVENTOR(S)        : Akay et al.

It is certified that error appears in the above-identified patent and that said Letters Patent is hereby corrected as shown below:

Patent Column 3, Line 39
"FIGS. 19A-9D" should be --9A-9D--.

Patent Column 15, Line 11
"(O)" should be --($\Omega$)--.

Signed and Sealed this
Twenty-second Day of February, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,820,729 B2 |
| APPLICATION NO. | : 11/403996 |
| DATED | : October 26, 2010 |
| INVENTOR(S) | : Akay et al. |

It is certified that error appears in the above-identified patent and that said Letters Patent is hereby corrected as shown below:

Patent Column 4, Line 27 (Application Page 8, Line 18)
"kw" should be --kW--.

Patent Column 4, Line 28 (Application Page 8, Line 19)
"kw" should be --kW--.

Patent Column 7, Line 54 (Application Page 16, Line 18)
After "may", insert --be--.

Patent Column 18, Line 52 (Application Page 42, Line 12)
"allow" should be --allowed--.

Patent Column 21, Line 5 (Application Page 9, Line 17)
of Preliminary Amendment dated 08/09/06)
"FIG. 12A-D" should be --FIGS. 12A-D--.

Patent Column 21, Line 26 (Application Page 47, Line 22)
Delete second occurrence of "used".

Patent Column 21, Line 45 (Application Page 48, Line 14)
"experiment" should be --experiments--.

Patent Column 24, Line 6 (Application Page 53, Line 15)
After "Example 11", insert --may--.

Signed and Sealed this
Nineteenth Day of April, 2011

David J. Kappos
*Director of the United States Patent and Trademark Office*